US012549927B2

(12) United States Patent
Jamadagni et al.

(10) Patent No.: US 12,549,927 B2
(45) Date of Patent: Feb. 10, 2026

(54) SYSTEM AND METHOD FOR BROADCASTING OR MULTICASTING CONTENT IN NETWORKS

(71) Applicant: JIO PLATFORMS LIMITED, Ahmedabad (IN)

(72) Inventors: Satish Nanjunda Swamy Jamadagni, Karnataka (IN); Mahesh Nayaka Mysore Annaiah, Karnataka (IN); Mathew Oommen, Maharashtra (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 240 days.

(21) Appl. No.: 18/246,431

(22) PCT Filed: Mar. 28, 2022

(86) PCT No.: PCT/IB2022/052827
§ 371 (c)(1),
(2) Date: Mar. 23, 2023

(87) PCT Pub. No.: WO2022/208306
PCT Pub. Date: Oct. 6, 2022

(65) Prior Publication Data
US 2025/0267430 A1 Aug. 21, 2025

(30) Foreign Application Priority Data
Mar. 31, 2021 (IN) .............................. 202121014967

(51) Int. Cl.
H04W 4/06 (2009.01)
(52) U.S. Cl.
CPC ..................................... H04W 4/06 (2013.01)
(58) Field of Classification Search
CPC ....................................................... H04W 4/06
See application file for complete search history.

(56) References Cited

U.S. PATENT DOCUMENTS

2019/0394619 A1* 12/2019 Gholmieh ............... H04W 4/06
2020/0351984 A1* 11/2020 Talebi Fard ............ H04W 4/08
(Continued)

FOREIGN PATENT DOCUMENTS

WO        2021045532 A1      3/2021

OTHER PUBLICATIONS

International Search Report from International Appl. No. PCT/IB2022/052827, mailed Jun. 21, 2022.

Primary Examiner — Michael A Keller
(74) Attorney, Agent, or Firm — FINNEGAN, HENDERSON FARABOW, GARRETT & DUNNER, LLP

(57) ABSTRACT

Present disclosure generally relates to wireless communication, particularly to system and method for broadcasting or multicasting content in networks. The system receives establishment request to establish broadcast channel via UE communicatively coupled to device and authenticates device or UE for establishing broadcast channel. The system determines, if devices or UE is authorized to establish broadcast channel and transmits response corresponding to request, to device or UE. The system receives membership notification corresponding to membership setup request associated with membership, from device of UE and transmits membership confirmation response corresponding to membership setup request. The system triggers authentication of device of UE, service type identification, and paging of broadcast membership, multicast membership, for initiating broadcast by device or UE System broadcasts or multicasts content received from device or UE, upon triggered authentication is successful.

18 Claims, 10 Drawing Sheets

(56) References Cited

U.S. PATENT DOCUMENTS

2022/0329983 A1\* 10/2022 Jeong .................... H04W 12/06
2022/0330072 A1\* 10/2022 Zeng ..................... H04W 24/10

\* cited by examiner

SYSTEM AND METHOD FOR BROADCASTING OR MULTICASTING CONTENT IN NETWORKS

RESERVATION OF RIGHTS

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (herein after referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner. The contents of this patent document may be defined in 3GPP Technical Specification (TS) 26.346.

FIELD OF INVENTION

The embodiments of the present disclosure generally relate to wireless communication. More particularly, the present disclosure relates to a system and a method for broadcasting or multicasting content in networks.

BACKGROUND OF THE INVENTION

The following description of related art may be intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

In general, broadcasting or multicasting may be a way of transmission of data from a source device to a destination device. A content provider or multicast/broadcast source may provide discrete and continuous media, as well as service descriptions and control data, to a Broadcast Multicast Service Centre (BMSC) to offer services at a time. The content provider may provide media formats to a BM-SC, typically through the xMB interface and initiates services and sessions through the xMB interface. Further, three distinct functional layers may be defined for the delivery of Multimedia Broadcast Multicast Services (MBMS) based service such as user service or user application, delivery method and bearer service. The MBMS-aware application is an application in the user space that communicates with the MBMS client through APIs. The MBMS-aware application may be an application in the user space that communicates with the MBMS client through APIs. The MBMS client may be a function that implements functionalities defined in 3GPP Technical Specification (TS) 26.346 and may provide APIs and protocol-related methods to expose relevant functionalities to an MBMS-aware application.

The Bearer provide the mechanism by which Internet Protocol (IP) data may be transported. One such type of bearer may be the MBMS bearer which may be used to transport multicast and broadcast traffic in an efficient one-to-many manner and may be the foundation of MBMS-based services. The MBMS bearers may be used jointly with unicast Packet Data Protocol (PDP) in offering complete service capabilities. When delivering the MBMS content to a receiving application, one or more delivery methods such as download, streaming, transparent, and group communication may be possible. The delivery layer provides functionality such as security and key distribution, reliability control by means of forward-error-correction techniques and associated delivery procedures. such as file-repair, delivery verification. The delivery methods may use MBMS bearers and may make use of point-to-point bearers through a set of MBMS associated procedures. The MBMS user service may enable applications, and different applications may impose different requirements when delivering content to MBMS subscribers and may use different MBMS delivery methods. For example, a messaging application such as Multimedia Messaging Service (MMS) may use the download delivery method while a streaming application such as Packet-Switched Streaming Service (PSS) would use the streaming delivery method, and a group communications application such as Mission-Critical Push-To-Talk (MCPTT) may use the group communication delivery method. Further, the MBMS user service may simultaneously use one or several MBMS delivery methods.

Further, upon using a xMB reference point, content provider can invoke procedures supported by BMSC(s) to setup and manage the MBMS user service from BMSC to the MBMS clients. The BMSC may define an endpoint with all supported procedures on the xMB interface, which can then be converted to SGmb procedures for the interface between BMSC and MBMS Gateway (GW). The BMSC may forward the received content for unicast delivery for appropriate functions (for example, the MBMS user service fallback). Moreover, in Fourth Generation (4G) and Fifth Generation (5G) networks, the content provider may always be located in the network infrastructure side and the MBMS client and the MBMS-aware application (a content receiver) may be located at a User Equipment (UE) or a device side. The UE can also act as a content source for the broadcast or the multicast of the content. However, before the UE initiates any content transfer to the BMSC, the UE may have to be authenticated by the BMSC. Also, forwarding local broadcast data to the BMSC and again getting back to a Radio Access Network (RAN) for actual broadcast or the multicast of content may be required in conventional approaches, which makes the system time consuming, less reliable and less efficient.

Therefore, there is a need in the art to provide a robust, reliable and efficient. system and method for broadcasting or multicasting content in networks.

OBJECTS OF THE PRESENT DISCLOSURE

Some of the objects of the present disclosure, which at least one embodiment herein satisfies are as listed herein below.

In a general aspect, the present disclosure provides a system and a method for broadcasting or multicasting content in) networks.

In an aspect, the present disclosure enables the broadcasting or multicasting within the RAN and using the core network for a very few functionalities such as paging.

In another aspect, the present disclosure avoids forwarding Local Broadcast (LB) data to the BMSC and again getting back to the RAN for actual broadcast or the multicast of the content.

In another aspect, the present disclosure avoids the Authentication and Authorization (AA) performed normally by BMSC for MBMS. Instead, embodiments herein reuse the Authentication performed by the core network during the initial Attach or Registration procedures, as the User Equipment (UE) are Content Providers (CP) or the Content Sources (CS).

In yet another aspect, the present disclosure provides multiple local broadcast channels which can be set up to monitor emergency situations.

SUMMARY

This section is provided to introduce certain objects and aspects of the present invention in a simplified form that are further described below in the detailed description. This summary is not intended to identify the key features or the scope of the claimed subject matter.

In an aspect, the present disclosure provides a system for broadcasting or multicasting content in network. The system receives, from at least one device, an establishment request to establish a broadcast channel via a User Equipment (UE) communicatively coupled to the at least one device. The establishment request includes a location granularity provided by the UE. Further, the system authenticates at least one of the at least one device and the UE for establishing the broadcast channel, upon receiving the establishment request. Furthermore, the system determines, if at least one of the at least one device and the UE may be authorized to establish the broadcast channel with a network. Thereafter, the system transmits the response corresponding to the request, to at least one of the at least one device and the UE, based on authentication and authorization of at least one of the at least one device and the UE. The response may be received from network. Further, the system receives a membership notification corresponding to a membership setup request associated with a membership, from at least one of the at least one device and the UE, upon receiving the response. The membership includes at least one of a broadcast membership, and a multicast membership. Furthermore, the system transmits a membership confirmation response corresponding to the membership setup request, upon setting up at least one of, the broadcast membership, and the multicast membership, based on the membership setup request. Thereafter, the system triggers authentication of the at least one device, the UE, a service type identification and a paging of at least one of, the broadcast membership, the multicast membership, for initiating the broadcast by at least one of the at least one device and the UE. Further, the system broadcasts or multicasts content received from at least one of the at least one device and the UE, upon triggered authentication may be successful.

In another aspect, the present disclosure further provides a method for broadcasting or multicasting content in networks. The method includes receiving, from at least one device, an establishment request to establish a broadcast channel via a User Equipment (UE) communicatively coupled to the at least one device. The establishment request includes a location granularity provided by the UE. Further, the method includes authenticating at least one of the at least one device and the UE for establishing the broadcast channel, upon receiving the establishment request. Furthermore, the method includes determining, if at least one of the at least one device and the UE may be authorized to establish the broadcast channel with network and a Fifth Generation (5G) network. Thereafter, the method includes transmitting the response corresponding to the request, to at least one of the at least one device and the UE, based on authentication and authorization of at least one of the at least one device and the UE. The response may be received from the network. Further, the method includes receiving a membership notification corresponding to a membership setup request associated with a membership, from at least one of the at least one device and the UE, upon receiving the response. The membership includes at least one of a broadcast membership, and a multicast membership. Furthermore, the method includes transmitting a membership confirmation response corresponding to the membership setup request, upon setting up at least one of, the broadcast membership, and the multicast membership, based on the membership setup request. Thereafter, the method includes triggering authentication of the at least one device, the UE, a service type identification and a paging of at least one of, the broadcast membership, the multicast membership, for initiating the broadcast by at least one of the at least one device and the UE. Also, the method includes broadcasting or multicasting content received from at least one of the at least one device and the UE, upon triggered authentication may be successful.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

Figure 1:
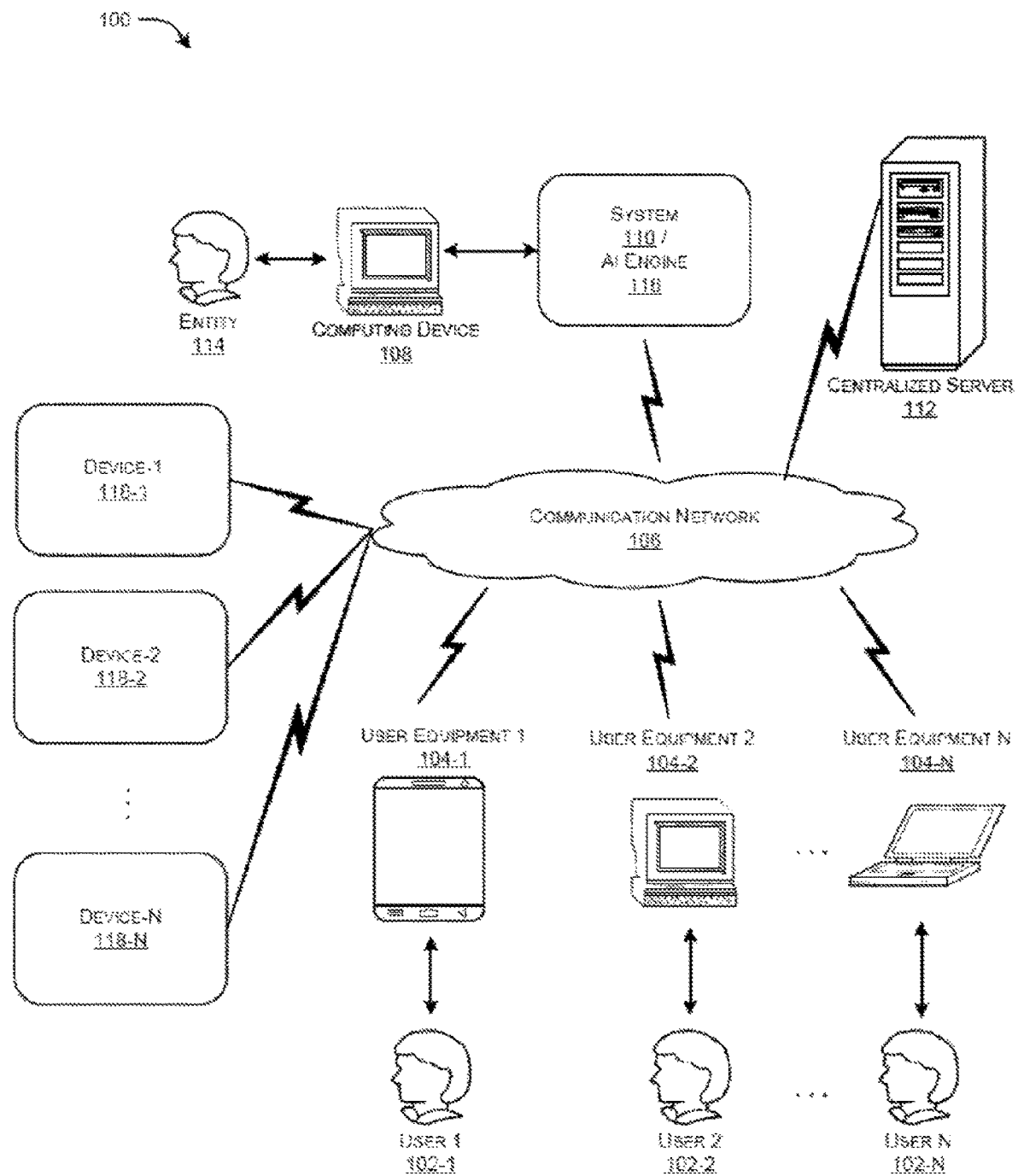
FIG. 1 illustrates an exemplary network architecture in which or with which the system of the present disclosure can be implemented for broadcasting or multicasting content in networks, in accordance with an embodiment of the present disclosure.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Various embodiments of the present disclosure relate to system and method for broadcasting or multicasting content in networks. The present disclosure enables the broadcasting or multicasting within the RAN and using the core network for a very few functionalities such as paging. This avoids forwarding Local Broadcast (LB) data to the BMSC and again getting back to the RAN for actual broadcast or the multicast of the content. Also, the present disclosure avoids the Authentication and Authorization (AA) performed normally by BMSC for MBMS. Instead, embodiments herein reuse the Authentication performed by the core network during the initial Attach or Registration procedures, as the User Equipment (UE) are Content Providers (CP) or the Content Sources (CS). In the case of Local Broadcast (LB), the UE acting as the CP or the CS, generates the Local Broadcast content and uploads the content to the eNB or the gNB, with which the UE successfully established the RRC Connection. The eNB or the gNB, in turn notifies all the UEs within the cell (in case of own cell level) and all the UEs within all the eNBs or the gNBs belonging to the MBSFN area (in case of own MBSFN level), regarding the resource allocation for the Local broadcast and transmits the actual Local Broadcast data using the MCCH or the MTCH Channel in Fourth Generation (4G) as an example. One use case is in an enterprise application scenario where multiple local broadcast channels which can be set up to monitor emergency situations. A user can start broadcasting on such a channel and the subscribed users get a live feed of the emergency. The feed for triggering a broadcast channel could also come from a for example, security camera, and the decision to trigger the broadcast channel would come from a situation analysis via a one of an Artificial Intelligence (AI) or a Machine Learning (ML) analysis tool on, for example, camera.

Referring to FIG. 1 that illustrates an exemplary network architecture for content broadcasting or multicasting system (100) (also referred to as network architecture (100)) in which or with which a system (110) of the present disclosure can be implemented, in accordance with an embodiment of the present disclosure. As illustrated, the exemplary network architecture (100) may be equipped with the system (110) for broadcasting or multicasting content in network to users (102-1, 102-2, . . . 102-N) (individually referred to as the user (102) and collectively referred to as the users (102)) associated with one or more User Equipment (UE) (104-1, 104-2 . . . 104-N) (individually referred to as the UE (104) and collectively referred to as the UEs (104)). The network may include at least one of a Fourth Generation (4G) network, a Fifth Generation (5G) network, a Sixth (6G) Generation network, and the like. The system (110) may be further operatively coupled to a computing device (108) associated with an entity (114). The entity (114) may include a vendor, a network operator, a company, an organization, a university, a lab facility, a business enterprise, a defense facility, or any other secured facility. In some implementations, the system (110) may also be associated with the computing device (108). Further, the system (110) may also be communicatively coupled to the one or more UEs (104) via a communication network (106). Furthermore, the network architecture (100) may include devices (118-1, 118-2, . . . 118-N) (individually referred to as the device (118) and collectively referred to as the devices (118)). The device (118) may be communicatively coupled to the UEs (104). The device (118) may communicate with the system (110) directly using suitable wireless interfaces or may communicate with the system (110) via the UE (104).

In some implementations, the UEs (104) may include, but are not limited to, a handheld wireless communication device (e.g., a mobile phone, a smart phone, a phablet device, and so on), a wearable computer device (e.g., a head-mounted display computer device, a head-mounted camera device, a wristwatch computer device, and so on), a Global Positioning System (GPS) device, a laptop computer, a tablet computer, or another type of portable computer, a media playing device, a portable gaming system, and/or any other type of computer device with wireless communication capabilities, and the like. In some implementation, the devices (118) may include, but are not limited to, cameras, security cameras, Closed Circuit Television (CCTV) cameras, depth cameras, object tracking cameras, Red Green Blue (RGB)/RGB depth cameras, night vision cameras, infrared camera, sensors, and the like.

In some implementation, one of the UE (104) may function as a content provider or a content source. In another implementation, the device (118) may provide the content via the UE (104) to the system (110). Also, the device (118) may provide the content directly to the system (110) via wireless interface associated with the device (118). In yet another implementation, the UEs (104) may function as content receivers, in which one of the UE (104) may be content provider or the content source.

In some implementations, the system (110) may be coupled to a centralized server (112). The centralized server (112) may also be operatively coupled to the one or more electronic devices (104) and the computing devices (108) through the communication network (106). In some implementations, the system (110) may also be associated with the centralized server (112). In some implementations, the system (110) may be a standalone device and may be communicatively coupled to the computing device (108) and/or the centralized server (112). In another implementation, the system (110) may be associated with computing device (108) or the centralized server (112). The system (110) may be implemented in, but are not limited to, an electronic device, a mobile device, a server, and the like. Such server may include, but not limited to, a standalone server, a remote server, a cloud server, dedicated server, and the like.

Although FIG. 1 shows exemplary components of the network architecture (100), in other implementations, the network architecture (100) may include fewer components, different components, differently arranged components, or additional functional components than depicted in FIG. 1. Additionally, or alternatively, one or more components of the network architecture (100) may perform functions described as being performed by one or more other components of the network architecture (100).

For instance, the network architecture (100) may include a number of layers (not shown in FIG. 1) including, but are not limited to, a network platform (e.g., servers, databases), network infrastructure (e.g., fiber networks, cellular towers, cable networks, switches), computing devices (e.g., client devices, computers, smartphones, tablets), operating systems, applications (e.g., social network applications, e-commerce applications, third-party applications, operators' applications, carriers' applications), and the like. The network platform may provide content and services to UEs (104) through the network infrastructure and the computing devices. The computing devices may include device hardware (e.g., computers, smartphones, tablets) and may be associated with particular data plans provided by one or more network operators.

In some implementations, the system (110) may be a standalone device and may be communicatively coupled to the computing device (not shown in FIG. 1) and/or a centralized server (not shown in FIG. 1). In another implementation, the system (110) may be associated with the computing device or the centralized server. The system (110) may be implemented in, but are not limited to, an electronic device, a mobile device, a wireless device, a wired device, a server, and the like. Such server may include, but not limited to, a standalone server, a remote server, a cloud server, dedicated server, and the like.

The system (110) may be further operatively coupled to a computing device associated with an entity (not shown in FIG. 1). The entity may include a company, an organization, a network operator, a vendor, a university, a lab facility, a business enterprise, a defense facility, or any other secured facility. Further, the entity may analyze the data or output from the system (110). In some implementations, the system (110) may also be associated with the computing device. Further, the system (110) may also be communicatively coupled to the UEs (104) via a communication network (106) of the network architecture (100). The communication network (106) may be a wired communication network and/or a wireless communication network.

The communication network (106) may include base stations or other access points (not shown in FIG. 1) that provide wireless connectivity to a corresponding plurality of cells (not shown in FIG. 1). The geographic extent of actual cells may depend on factors including, but not limited to, geography, topology, environmental conditions, transmission powers, or transmission power distributions and may therefore be irregular or time-variable.

The communication network (106) may include a controller (not shown in FIG. 1) that may be used to configure the cells for unicast transmissions or multicast/broadcast transmissions such as transmissions of a multimedia broadcast multicast service (MBMS). As used herein, the term "multicast" may be used to refer to transmission of information over a channel or group of channels that can be received or accessed by multiple users such as users (102) that subscribe to the MBMS service. As used herein, the term "broadcast" may also be used to refer to transmission of information over a channel or group of channels that can be received or accessed by multiple users (102). Broadcasting and multicasting may be distinguished at least in part because multicasting may provide the capability for forming multicast groups of users. As used herein, the term "broadcast/multicast session" should be understood to refer to a session that can be used to carry broadcast or multicast transmissions. Examples of broadcast/multicast sessions may include, but are not limited to, MBMS sessions or evolved MBMS (eMBMS) sessions. Furthermore, the broadcast/multicast session does not necessarily carry either broadcast or multicast transmissions at any particular time because the transmissions may depend on the available programming and the choices made by individual users. Broadcasting or multicasting can be contrasted with unicasting, in which information may be transmitted from a base station or access point to a single user and other users are not authorized or able to access the unicast information. Cells may broadcast or unicast data to users such as the users (102). As used herein, the term "user" may refer to wireless devices such as User Equipment (UE) (104) or to a person using the wireless device to access the system (110).

Wireless communication standards such as Long-Term Evolution (LTE, LTE-Advanced, Fourth Generation (40)), Next Generation (New Radio (NR), Fifth Generation (50)), Sixth Generation (60) may support broadcasting services such as the Multimedia Broadcast Multicast Service (MBMS) or the enhanced Multimedia Broadcast Multicast Service (eMBMS). The MBMS services broadcast or multicast data from base stations over the air interface on channels that can be received by one or more users (102). The eMBMS may be an enhanced version of MBMS that provides additional features such as an architecture and physical layer enhancements that allow the eMBMS service to carry multimedia information to the User Equipment (UE) (104). The eMBMS service can transmit information towards user equipment by broadcasting or multicasting to the UE (104) in a Multicast Broadcast Single Frequency Network (MB-SFN) mode. A SFN may be generally understood to be a broadcast network where more than one transmitter simultaneously or concurrently sends the same signal over the same frequency channel. The MB-SFN mode may be used to transmit the same information from all of the base stations in a selected group of cells or coverage area. Each of the base stations in the MB-SFN area transmits the same content time-aligned in the same resource blocks of the physical layer. Constructive combination of the signals transmitted by the different base stations in the MB-SFN area enhances the received signal strength and reduces interference within the cells of the MB-SFN area.

Figure 2:
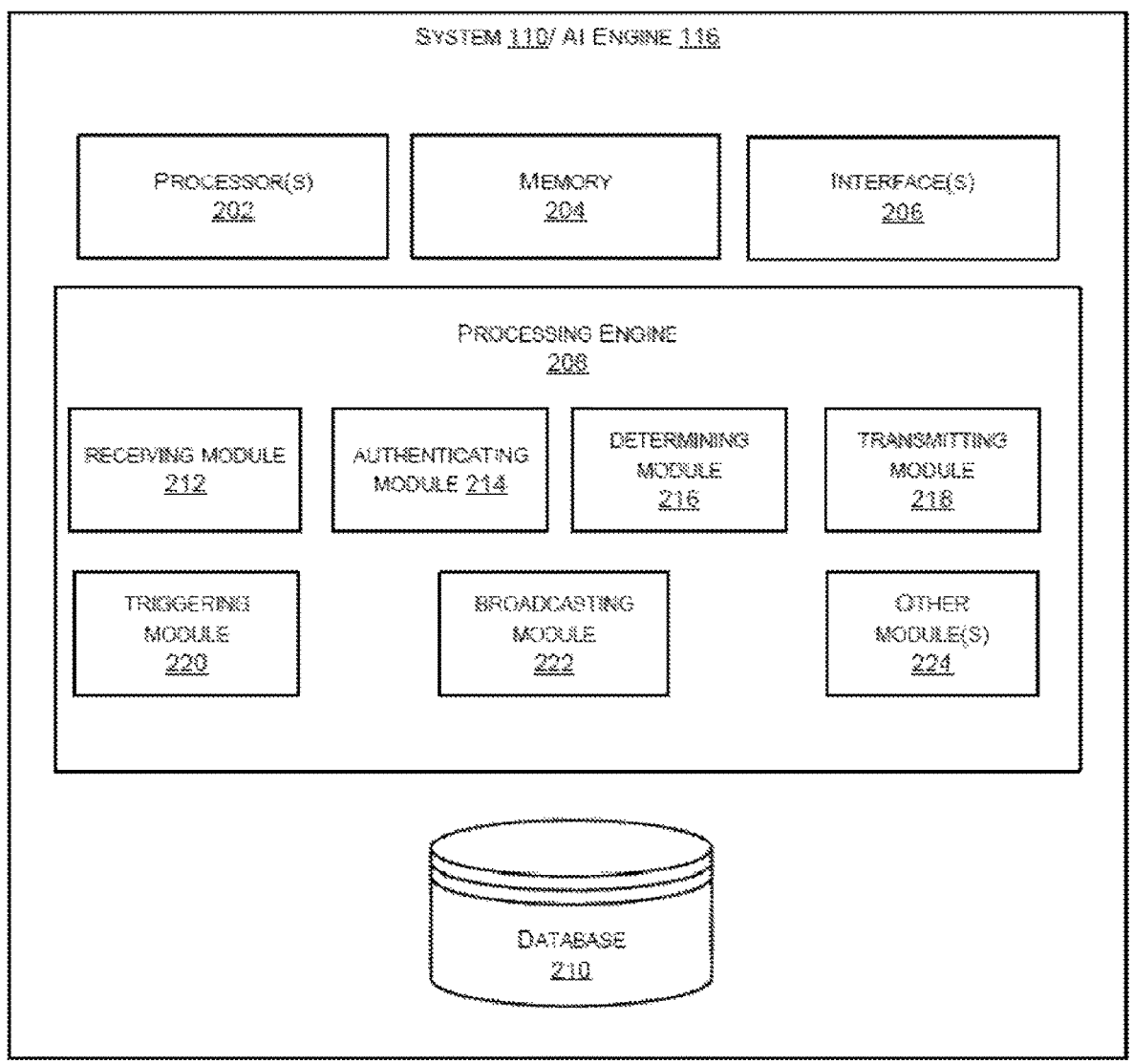
FIG. 2 illustrates an exemplary detailed representation of a system for broadcasting or multicasting content in networks, in accordance with an embodiment of the present disclosure.

In an embodiment, the system (110) may include one or more processors coupled with a memory, wherein the memory may store instructions which when executed by the one or more processors may cause the system (110) to perform broadcasting or multicasting content in networks. An exemplary representation of the system (110) for broadcasting or multicasting content in networks. in accordance with an embodiment of the present disclosure, is shown in FIG. 2. In an aspect, the system (110) may include one or more processor(s) (202). The one or more processor(s) (202) may be implemented as one or more microprocessors, microcomputers, microcontrollers, edge or fog microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the system (110). The memory (204) may be configured to store one or more computer-readable instructions or routines in a non-transitory computer readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the system (110) may include an interface(s) (206). The interface(s) (206) may comprise a variety of interfaces, for example, interfaces for data input and output devices. referred to as I/O devices, storage devices, and the like. The interface(s) (206) may facilitate communication of the system (110). The interface(s) (206) may also provide a communication pathway for one or more components of the system (110). Examples of such components include, but are not limited to, processing unit/engine(s) (208) and a database (210).

The processing unit/engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (110) may include the machine-readable storage medium storing the instructions and the processing resource to execute the instructions, or the machine-readable storage medium may be separate but accessible to the system (110) and the processing resource. In other examples, the processing engine(s) (208) may be implemented by electronic circuitry.

The processing engine (208) may include one or more modules/engines selected from any of a receiving module (212), an authenticating module (214), a determining module (216), a transmitting module (218), a triggering module (220), a broadcasting module (222), and other module(s) (224). The processing engine (208) may further be edge based micro service event processing, but not limited to the like.

In an embodiment, the UE (104) may be initially authenticated by a Broadcast Multicast Service Center (BMSC) using one or more pre-defined procedures defined by at least one of a Mobility Management Entity (MME) associated with the 4G network and an Access and Mobility Management Function (AMF) associated with the 5G network. The MME may be communicatively coupled the UE (104) via an Evolved Universal Terrestrial Radio Access Network (E-UTRAN) and the BMSC may be communicatively coupled to the UE (104) via a Multimedia Broadcast Multicast Services-Gateway (MBMS-GW), and may be operatively coupled to a content provider. For initially authenticating by the BMSC, the system (110) may receive an Authentication and Authorization (AA) request from the UE (104) to transmit to the MME during initial attach procedure of the UE (104), when the UE (104) may be the content provider. The AA request may be transmitted by the MME to the Multimedia Broadcast Multicast Services-Gateway (MBMS-GW). The attach procedure of the UE (104) includes mandatory UE (104) network capability Information Element (IE). Further, the system (110) may receive a Tracking Area Update (TAU) request from the UE (104) to transmit to the MME, when the UE may be the content provider. The TAU request includes optional UE network capability Information Element (IE). In an embodiment, the UE network capability Information Element (IE) includes a UE Content Provider (CP) Information Element (IE). When the UE CP IE may be dynamically updated, then the UE (104) notifies the update to the MME by triggering the TAU procedure. The MME in turn notifies the update to the BMSC for further authentication and authorization of the UE (104) as a content provider or as a content source.

Further, the system (110) may receive a Re Authentication Request (RAR) from the MBMS-GW to transmit to the BMSC. Furthermore, the system (110) may transmit a RAR response to the MBMS-GW from the BMSC, on successful completion of the authentication and authorization. Thereafter, the system (110) may transmit an AA response received from the MBMS-GW to the MME. Further, the system (110) may authorize the UE to generate the content and to initiate uploading the content, upon the attach procedure or the TAU may be completed.

In an embodiment, the receiving module (212) may receive, from at least one device (118), an establishment request to establish a broadcast channel via a User Equipment (UE) (104) communicatively coupled to the at least one device (118). The establishment request may include a location granularity provided by the UE (104). The establishment request may include, but are not limited to, a Radio Resource Control (RRC) message, a Non-Access Stratum (NAS) message, and the like. Further, receiving, from at least one device (118), the establishment request to establish the broadcast channel may be based on analyzing a situation in an environment of the at least one device (118). The situation may be analyzed using at least one of an Artificial Intelligence (AI) and a Machine Learning (ML) analysis associated with the at least one device (118).

In an embodiment, the authenticating module (214) may authenticate at least one of the at least one device (118) and the UB (104) for establishing the broadcast channel, upon receiving the establishment request.

In an embodiment, the determining module (216) may determine, if at least one of the at least one device (118) and the UE (104) may be authorized to establish the broadcast channel with the network.

In an embodiment, the transmitting module (218) may transmit the response corresponding to the request, to at least one of the at least one device (118) and the UE (104), based on authentication and authorization of at least one of the at least one device (118) and the UE (104). The response may be received from the network.

In an embodiment, the receiving module (212) may receive a membership notification corresponding to a membership setup request associated with a membership, from at least one of the at least one device (118) and the UE (104), upon receiving the response. The membership may include, but are not limited to, a broadcast membership, a multicast membership, and the like.

In an embodiment, the transmitting module (218) may transmit a membership confirmation response corresponding to the membership setup request, upon setting up at least one of the broadcast membership, and the multicast membership, based on the membership setup request.

In an embodiment, the triggering module (220) may trigger authentication of the at least one device (118), the UE (104), a service type identification and a paging of at least one of the broadcast membership, the multicast membership, for initiating the broadcast by at least one of the at least one device (118) and the UE (104). The membership may be deactivated by at least one of, a user triggered deactivation, and a machine type device triggered deactivation.

In an embodiment, the broadcasting module (222) may broadcast or multicast content received from at least one of the at least one device (118) and the UE (104), upon triggered authentication may be successful. The at least one of the at least one device (118) and the UE (104) may be operated as a content provider or a content source, and a Multimedia Broadcast Multicast Services (MBMS) network infrastructure may be reused for the broadcasting or the multicasting the content. When the UE (104) generates the content, the content may be first uploaded or streamed to a Broadcast Multicast Service Center (BMSC) using an Uplink (UL) connection, and the BMSC decides, whether to broadcast, multicast or unicast the content based on one or more group subscription of respective UEs (104). When the UE (104) may be at least one of, the content provider or the content source, then the UE (104) may generate at least one of local broadcast data and local multicast cast to upload to the RAN, with which the UE (104) has established a Radio Resource Control (RRC) connection. The local broadcast may include at least one of a cell level area and a Multimedia Broadcast Multicast Service over Single Frequency Network (MBSFN) level area. The local multicast includes at least one of a family group level, a friends group level, and a corporates group level. For the local multicast level, member registration to the concerned group may be essential.

For example, a local politician can publish the various schemes to respective constituency/territory people using the own cell level local broadcast. Similarly, the local area police station personal can send alerts to the public regarding the thieves or to indicate the probability of the theft event using the own cell level local broadcast. Similarly, local advertising agencies can advertise, local cinema industry can promote their cinemas, local politician can publish development portfolios or schemes to the public, or the like using the own MBSFN area level local broadcast.

In an instance, for the local multicast, people can register themselves for the family group, friends' group, different departments group or corporates group, and the like. Any data which can be generated locally by any member and which can be sharable to their concerned group, can be shared using the Local Multicast scheme within the RAN itself as much as possible. The scenarios or the use cases that can be considered, for example, at the Local Broadcast (LB) level are the own cell level, the own MBSFN area level or the like. At the Local Multicast (LM) level are the family group level, the friends group level, the corporates group level, or the like.

In an embodiment, the system (110) may be a System on Chip (SoC) system but not limited to the like. In another embodiment, an onsite data capture, storage, matching, processing, decision-making and actuation logic may be coded using Micro-Services Architecture (MSA) but not limited to it. A plurality of 5 microservices may be containerized and may be event based in order to support portability.

In an embodiment, the network architecture (100) may be modular and flexible to accommodate any kind of changes in the system (110) as proximate processing may be acquired towards re-estimating of stock. The system (110) configuration details can be modified on the fly.

In an embodiment, the system (110) may be remotely monitored and the data, application and physical security of the system (110) may be fully ensured. In an embodiment, the data may get collected meticulously and deposited in a cloud-based data lake to be processed to extract actionable insights. Therefore, the aspect of predictive maintenance can be accomplished.

In an exemplary embodiment, the communication network (106) may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. A network may include, by way of example but not limitation, one or more of: a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, some combination thereof.

In another exemplary embodiment, the centralized server (112) may include or comprise, by way of example but not limitation, one or more of: a stand-alone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof.

In an embodiment, the UEs (104) or the computing device (108) may communicate with the system (110) via set of executable instructions residing on any operating system, including but not limited to, Android™, iOS™, Kai OS™, and the like. In an embodiment, the UEs (104) may include, but not limited to, any electrical, electronic, electro-mechanical or an equipment or a combination of one or more of the above devices such as mobile phone, smartphone, virtual reality (VR) devices, augmented reality (AR) devices, laptop, a general-purpose computer, desktop. personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen and the like. It may be appreciated that the UEs (104) may not be restricted to the mentioned devices and various other devices may be used. A smart computing device may be one of the appropriate systems for storing data and other private/sensitive information.

Figure 3:
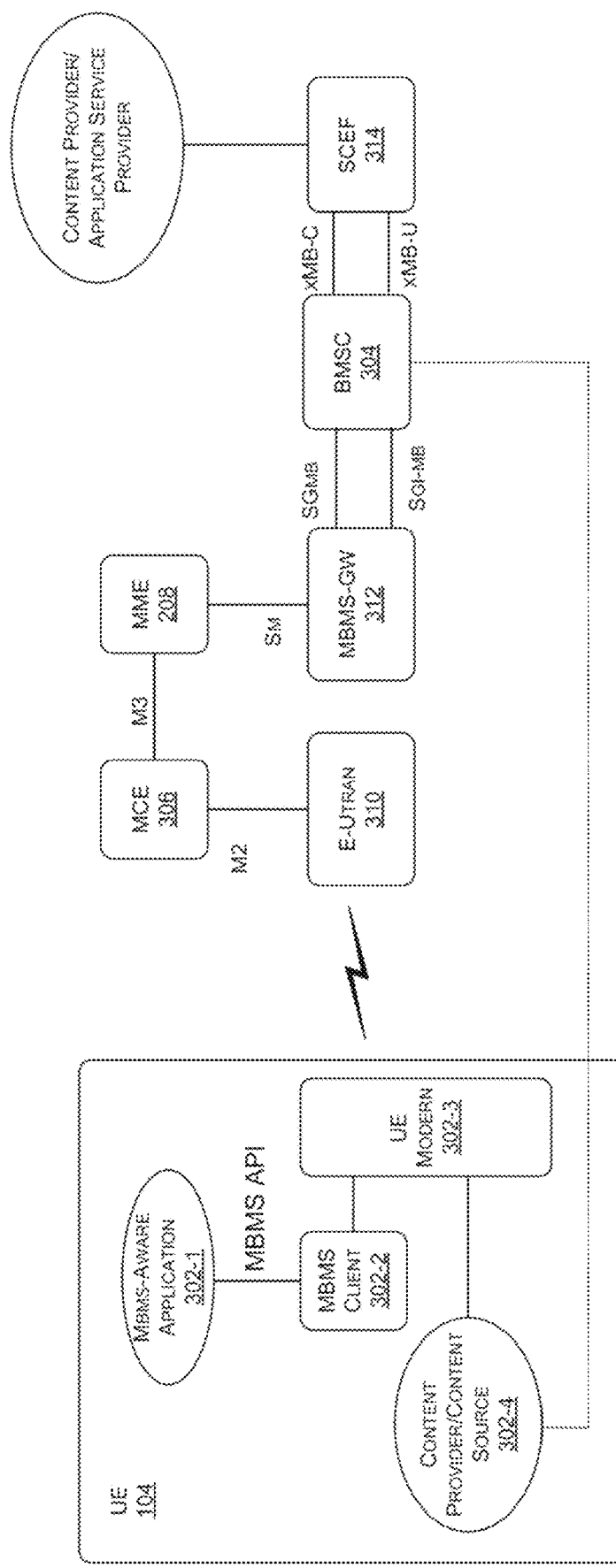
FIG. 3 illustrates an exemplary representation of an End-to-End Multimedia Broadcast Multicast Services (MBMS) architecture for Fourth Generation (4G), in accordance with an embodiment of the present disclosure.

FIG. 3 illustrates an exemplary representation of an End-to-End Multimedia Broadcast Multicast Services (MBMS) architecture (300) for Fourth Generation (40), in accordance with an embodiment of the present disclosure.

The UE (104) shown in FIG. 3 may include for example, MBMS aware application (302-1), MBMS client (302-2), UE modem (302-3), content provider/content source application (302-4). The UE Modem (302-3) may be a UE hardware which may modulate and demodulate to communicate directly with the network infrastructure across the Uu interface. In operation, one of the UE (104) or the at least one device (118) may be operated as a content provider and the MBMS network infrastructure may be reused for the broadcast or the multicast. The UE (104) may be enabled to generate a content, which can be broadcasted or multi-casted as usually from the network side. Further, the UE (104) may be initially authenticated by the BMSC (304) using at least one already defined xMB-C interface procedures by one of an MME (308) or an AMF. Consequently, as the UE (104) generates the content, the content may be first uploaded or streamed to the BMSC (304) using a normal UL connection. Further, the BMSC (304) decides, whether to broadcast, multicast or unicast the content based on one or more group subscription. Further, the UE (104) may be authenticated by BMSC (304) directly using the xMB-C interface related procedures, or the MME (308) can trigger the UE authentication with the BMSC (304) during initial attach procedure, using the xMB-C interface related procedures. The MME (308) may be connected to the UE (104) via E-UTRAN (310). The BMSC (304) may be connected to the UE (104) via MBMS-GW (312) and may be operatively coupled to the content provider via SCEF (314). Furthermore, the MBMS-GW (312) may communicate with BMSC (304) through SGmb interface for control plane data. Hence, the SGmb interface shall also include new procedures for forwarding the request for UE Authentication and Authorization (AA) as a content provider, received from the MME (308) towards BMSC (304). The MCE (306) may have the mapping between MBSFN area and the associated list of one of the eNBs or the gNBs and the plurality of cells. The MME (308) may communicate with MBMS-GW (312) through Sm interface.

The UE (104) may generate an establishment request to establish a broadcast channel by providing the location granularity to the Radio Access Network (RAN). In one embodiment, the request may be generated by at least one device (118). The request may be, but are not limited to, the RRC, the NAS message, and the like. In an instance, the at least one device (118) or the UE (104) may be authenticated and checked for the authorization by, for example generation Node B (gNB) (explicitly not shown in FIG. 3), for setting up of at least one broadcast channel. The gNB may generate a response and transmit the response corresponding to the generated request. Further, the at least one device (118) or the UE (104) may generate a membership notification corresponding to a membership setup request associated with a membership. The membership includes at least one of a broadcast membership, and a multicast membership. The UE (104) may receive a membership confirmation response corresponding to the membership setup request, upon setting up at least one of the broadcast membership, and the multicast membership, based on the membership setup request. An authentication may be triggered for the at least one device (118), the UE (104), a service type identification and a paging of at least one of the broadcast membership, the multicast membership, for initiating the broadcast by at least one of the at least one device (118) and the UE (104). The UE (104) may broadcast or multicast content received from at least one of the at least one device and the UE, upon triggered authentication may be successful.

Figure 4A:
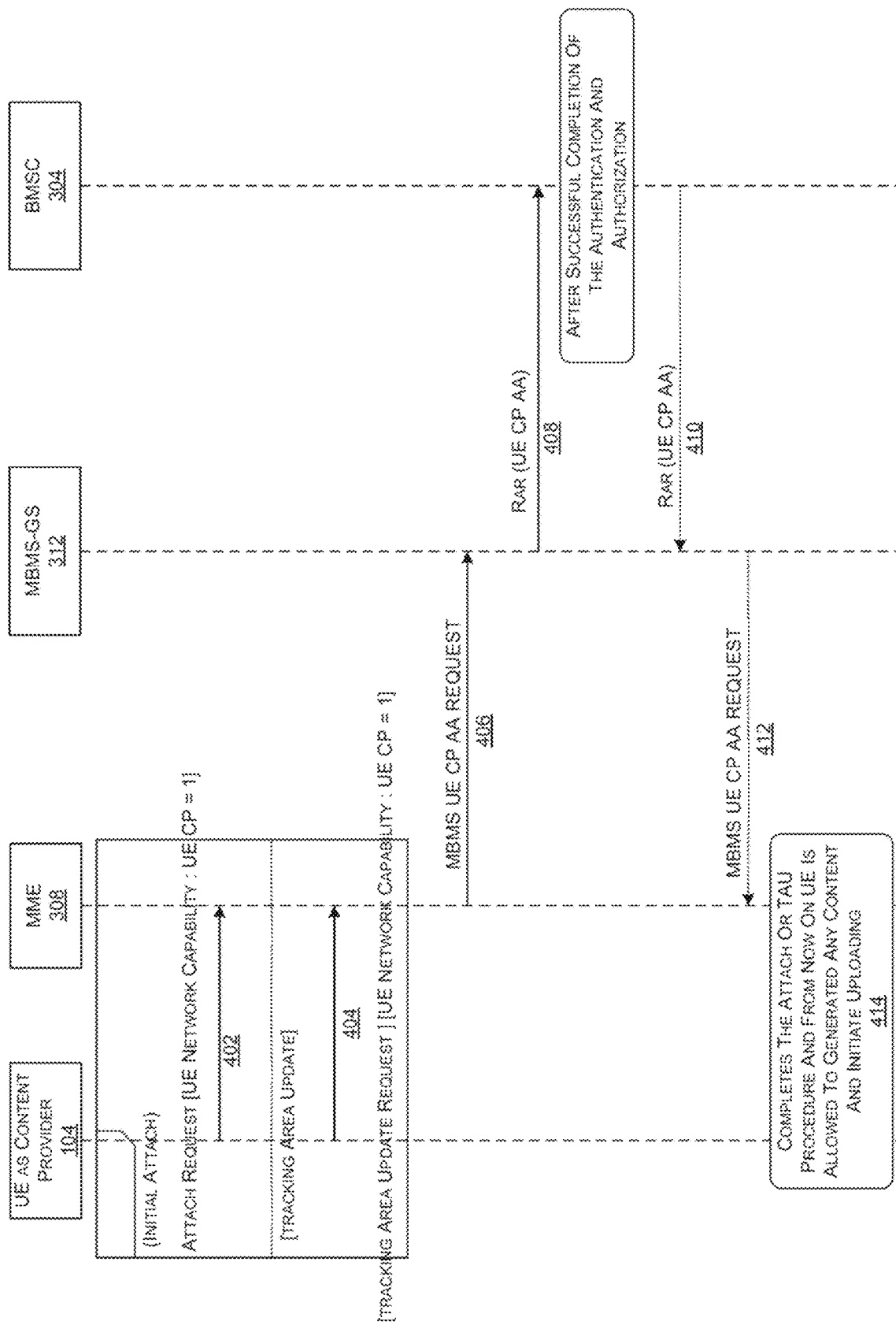
FIG. 4A illustrates an exemplary sequence diagram representation for notifying a User Equipment (UE) capability and triggering an Authentication and Authorization (AA) with a Broadcast Multicast Service Centre (BMSC), in accordance with an embodiment of the present disclosure.

FIG. 4A illustrates an exemplary sequence diagram representation for notifying a User Equipment (UE) capability and triggering an Authentication and Authorization (AA) with a Broadcast Multicast Service Centre (BMSC), in accordance with an embodiment of the present disclosure.

The UE network capability information element may be determined as shown in the Table 1 below:

TABLE 1

| 8 | 7 | 6 | 5 | 4 | 3 | 2 | 1 | |
|---|---|---|---|---|---|---|---|---|
| | | UE network capability IEI | | | | | | Octet 1 |
| | | Length of UE network capability contents | | | | | | Octet 2 |
| EEA0 | 128-EEA1 | 128-EEA2 | 128-EEA3 | EEA4 | EEA5 | EEA6 | EEA7 | Octet 3 |
| EIA0 | 128-EIA1 | 128-EIA2 | 128-EIA3 | EIA4 | EIA5 | EIA6 | EIA7 | Octet 4 |
| UEA0 | UEA1 | UEA2 | UEA3 | UEA4 | UEA5 | UEA6 | UEA7 | Octet 5 |
| UCS2 | UIA1 | UIA2 | UIA3 | UIA4 | UIA5 | UIA6 | UIA7 | Octet 6 |
| Pro-Se-dd | ProSc | H,245-ASH | ACC-CSFB | LPP | LCS | 1xSRVCC | NF | Octet 7 |
| ePCO | HC-CP CloT | ERw/oPDFN | S1-U data | UP CloT | CP CloT | Prose-relay | Pro-Se-dc | Octet 8 |
| 15 bearers | SGC | N1mode | DCNR | CP backoff | RestrictEC | V2X PC5 | multipleDR6 | Octet 9 |
| UE CP | 0 Spare | 0 | 0 | 0 | 0 | 0 | 0 | Octet 10 |
| 0 | 0 | 0 | 0 | 0 Sare | 0 | 0 | 0 | Octet 11-15 |

The UE Content Provider (UE CP) which need to added in the UE Network Capability information element, may be represented in the above Table 1. The UE (104) functionality supported (Octet 10, bit 8) may be represented as "0", which may depict that the UE Content Provider (UE CP) functionality may not supported. Further, a "1" in the Table 1 may depict that UE Content Provider (UE CP) functionality may be supported. The UE network capability information element may be mandatorily present in the "ATTACH REQUEST" message and optionally present in the "TRACKING AREA UPDATE" message. When the UE (104) may be performing initial attach with the network, the UE (104) may transmit the message to the MME (308). When the MME (308) receives the message and if the Information Element (IE) of "UE CP" may be set to '1' in the IE of "UE Network Capability", then the UE (104) can act as a Content Provider (CP). Hence, the MME (308) may decide to inform this to the BMSC (304) for further Authentication and Authorization (AA) of the UE (104) as the Content Provider (CP) or as the Content Source (CS).

Further, when the UE CP IE may be updated dynamically, for example, UE CP may be updated from '0' to '1', then the UE (104) may notify this change to the MME (308) by triggering the Tracking Area Update (TAU) procedure. This enables the MME (308) to inform this change to the BMSC (304) for further Authentication and Authorization (AA) of the UE (104) as the CP or the CS.

Furthermore, the UE Authentication and Authorization (AA) with the BMSC (304) can be presented as shown in the Table 2 below:

TABLE 2

| Message Type value (Decimal) | MBMS GW to MMS/SGSN (SmSn) Message | Reference | Initial | Triggered |
|---|---|---|---|---|
| 231 | MBMS Session Start Request | | X | |
| 232 | MBMS Session Start Response | | | X |
| 233 | MBMS Session Update Request | | X | |

TABLE 2-continued

| Message Type value (Decimal) | MBMS GW to MMS/SGSN (SmSn) Message | Reference | Initial | Triggered |
|---|---|---|---|---|
| 234 | MBMS Session Update Response | | | X |
| 235 | MBMS Session Stop Request | | X | |
| 236 | MBMS Session Stop Response | | | X |
| 237 | MBMS UE CP AA Request | | X | |
| 238 | MBMS UE CP AA Response | | | X |
| 239 | For future use Other | | | |
| 240 to 247 | Reserved for Sy interface (see also types 25 to 31) | TS 28.280 (15) | | |
| 248 to 255 | For future use | | | |

The MME (308) may communicate with MBMS-GW (312) through Sm interface. The Sm interface may include procedures to enable the MME (308) to initiate the UE Authentication and Authorization (AA) as the content provider with BMSC (304) via the MBMS-GW (312). The MME (308) may transmit the MBMS UE CP AA REQUEST message to the MBMS-GW (312) to trigger the Authentication and Authorization (AA) of the UE (104) as the Content Provider (CP). When the MBMS-GW (312) receives the successful response from the BMSC (304), then the MME (308) transmits the MBMS UE CP AA response message to the MME (308) indicating that the Authentication and Authorization (AA) of the UE (104) as the Content Provider (CP) may be successful.

Furthermore, the MBMS-GW (312) may communicate with the BMSC (304) through SGmb interface for control plane data. Hence, the SGmb interface shall also include new procedures for forwarding the request for UE Authentication and Authorization (AA) as the Content Provider (CP), received from the MME (308) towards BMSC (304).

In operation, at step 402, the UE (104) as a content provider may notify the UE capability and trigger the Authentication and Authorization (AA) with the BMSC (304), which includes generating an ATTACH request by the UE (104) to the MME (308), upon UE (104) being the content provider, when UE CP=1.

At step (404), the UE (104) may generate and transmit a tracking area update request to the MME (308), when UE CP=1. At step (406), the MME (308) may transmit a MBMS UE CP AA request to the MBMS-GW (312). At step (408), the MBMS-GW (312) may transmit Re Authentication Request (RAR) (via UE CP AA) to the BMSC (304).

Consequently, on successful completion of the authentication and authorization, at step (410) the RAR (UE CP AA) may be transmitted to the MBMS-GW (312) from the BMSC (304). At step (412), the MBMS-GW (312) may transmit MBMS UE CP AA response to the MME (308). Subsequently, at step (414), the ATTACH or the TAU may be completed and the UE (104) may be allowed to generate the content and to initiate the uploading of the content.

Figure 4B:
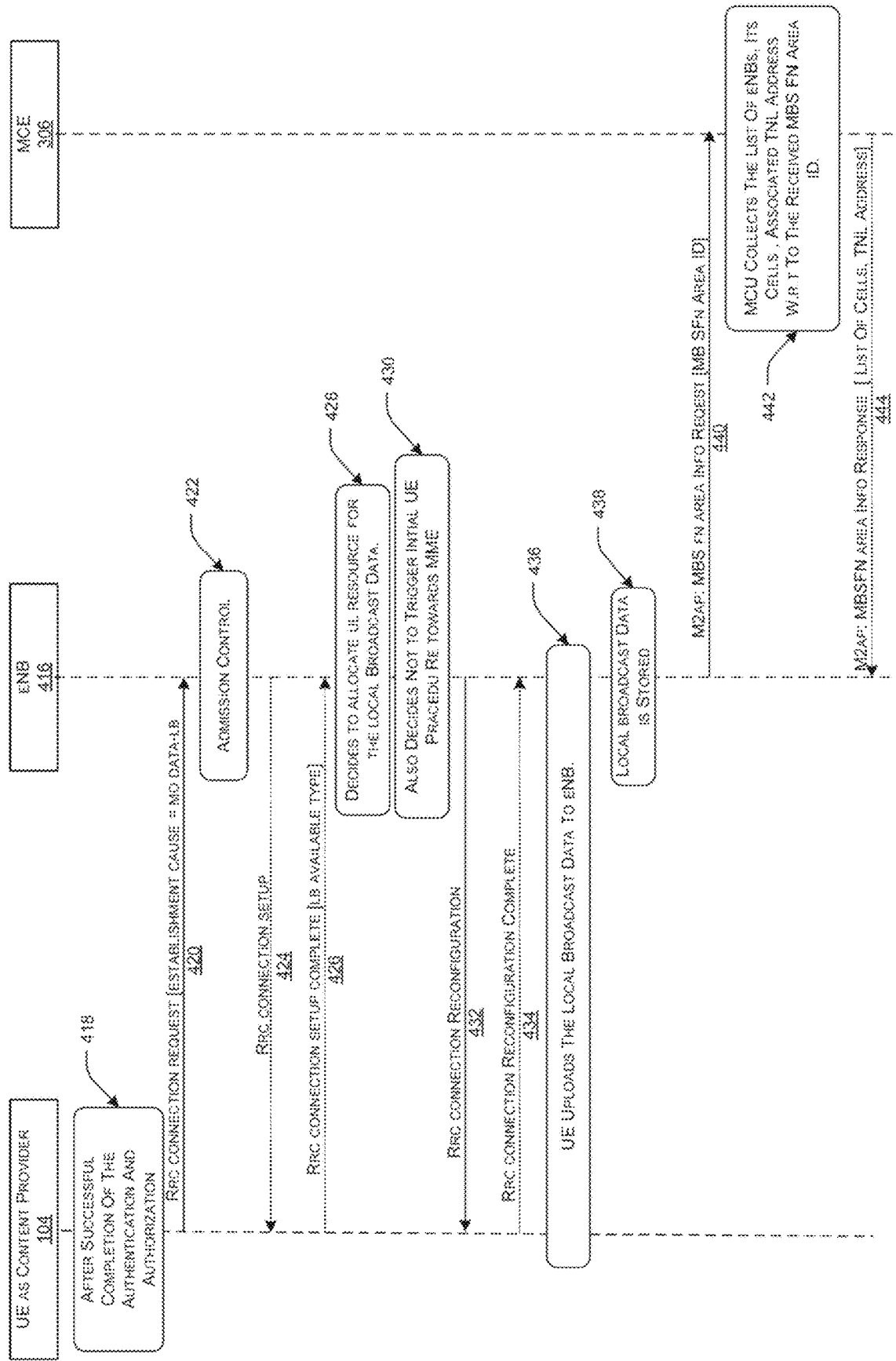
FIG. 4B illustrates an exemplary sequence diagram representation for collecting a Multimedia Broadcast Multicast Service over Single Frequency Network (MBSFN) area information for Local Broadcast (LB), in accordance with an embodiment of the present disclosure.

FIG. 4B illustrates an exemplary sequence diagram representation for collecting a Multimedia Broadcast Multicast Service over Single Frequency Network (MBSFN) area information for Local Broadcast (LB), in accordance with an embodiment of the present disclosure.

The sequence diagram may include local data sharing via broadcast/multicast mechanisms with in the RAN. For example, in an embodiment, UE (104) may be the Content Provider (CP) or the Content Source (CS). The UE (104) may upload the Local Broadcast (LB) data to one of eNB or a gNB. The eNB or the gNB stores the received local broadcast data until the broadcast transmission may be completed. The eNB or the gNB notifies all the UEs (104) regarding the local broadcast via one of a SIB13 or a MCCH interfaces. Further, the eNB or the gNB broadcast the stored data to all UEs (104) in corresponding plurality of cells via MTCH interface.

In another embodiment, the UE (104) may be the CP or the CS. The UE (104) may upload the Local Broadcast (LB) data to one of the eNB or the gNB. The eNB or the gNB may store the received local broadcast data until the broadcast transmission may be completed. The eNB or the gNB request for the list of eNBs, which belongs to the MBSFN area to which this cell belongs to, by sending the M2AP: MBSFN AREA INFO REQUEST" message to the MCE (306). The MCE (306) may be having the mapping between MBSFN area and the associated list of one of the eNBs or the gNBs and the plurality of cells. The MCE (306) may collect the list of one of the eNB or the gNBs and the plurality of cells under the requested MBSFN area and transmit the collected list to the one of the eNB or the gNB via M2AP: "MBSFN AREA INFO RESPONSE". Further, one of the eNB or the gNB may notify all the UEs (104) regarding the local broadcast via one of the SIB13 or the MCCH and broadcast the stored data to all UEs in the list of one of the eNBs or the gNBs and the plurality of cells via MTCH interface.

In operation, at step 418, the UE (104) may complete successful AA. At step (420), the UE (104) may transmit a RRC connection request to the eNB (416), when an establishment cause=mo-Data-LB 410. At step 422, the UE (104) may perform admission control. At step (424), the eNB (416) may transmit the RRC connection setup to the UE (104). At step (426), the UE (104) may transmit a notification to the eNB (416), upon RRC connection setup may be completed. At step (428), the CNB (416) may decide to allocated UL resources for the local broadcast data. At step (430), the eNB (416) may decide not to trigger the initial UE procedure towards the MME (308). At step (432), the eNB (416) may reconfigure a RRC connection to the UE (104). At step (434), the UE (104) may notify completion of the RRC connection reconfiguration to the eNB (416). Consequently, at step (436) the UE (104) uploads the local broadcast data to the eNB (416). At step (438), the eNB (416) may store the local broadcast data. At step (440), the eNB (416) may transmit a MBSFN area information request to the MCE (306). Consequently, at step (442), the MCE (306) may collect the list of a plurality of eNBs, corresponding cells and associated Transport Network Layer (TNL) address with respect to the received MBSFN area ID. At step (444), the MCE (306) may transmit the MBSFN area information response to the eNB (416).

Figure 4C:
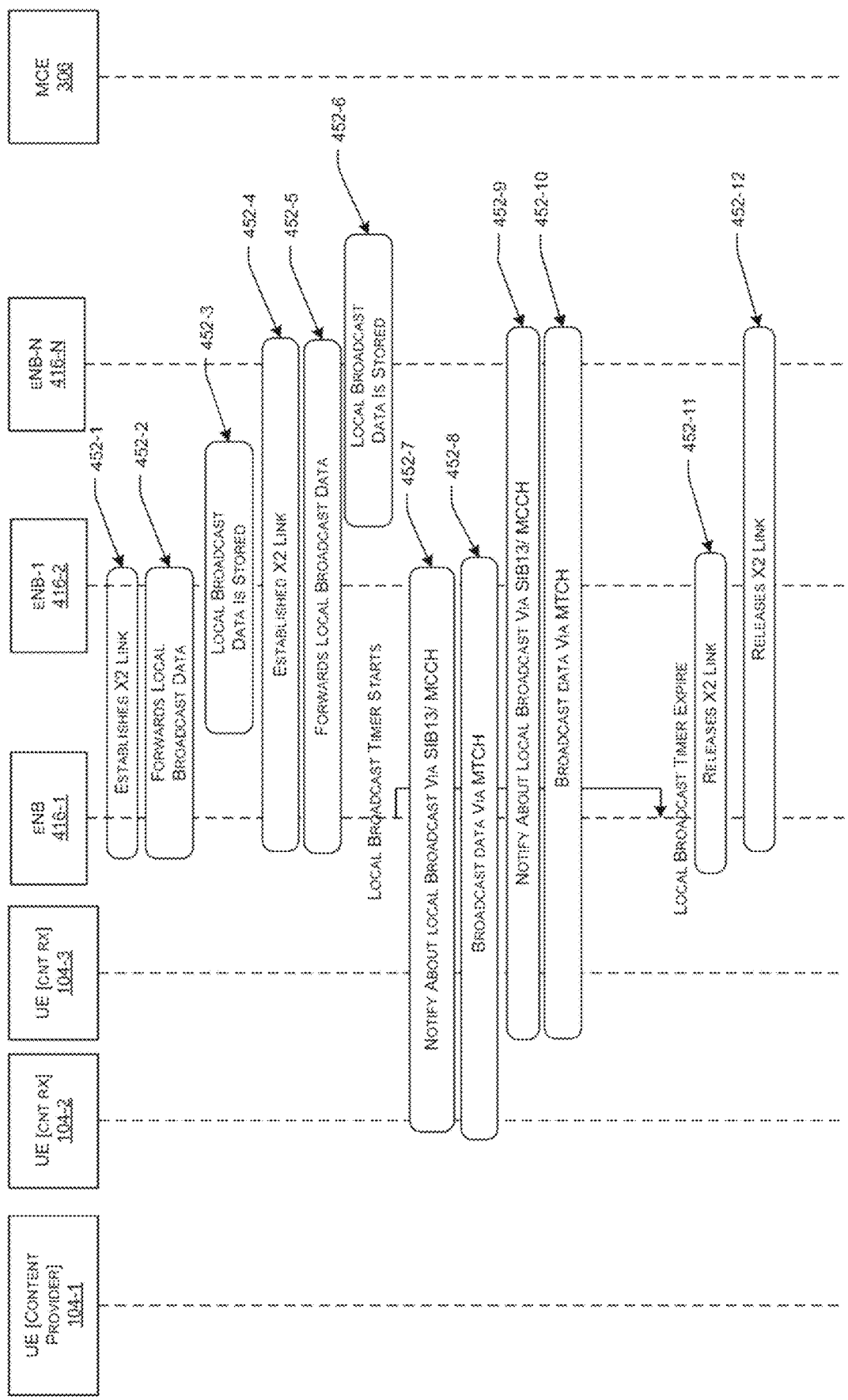
FIG. 4C illustrates an exemplary sequence diagram representation for Local Broadcasting (LB) with entire a Multimedia Broadcast Multicast Service over Single Frequency Network (MBSFN) area, in accordance with an embodiment of the present disclosure.

FIG. 4C illustrates an exemplary sequence diagram representation for Local Broadcasting (LB) with entire a Multimedia Broadcast Multicast Service over Single Frequency Network (MBSFN) area, in accordance with an embodiment of the present disclosure.

At step (452-1), the eNB-1 (416-1) and the eNB-2 (416-2) may establish X2 link. At step (452-2), the eNB-1 (416-1) may forward local broadcast data to the eNB-2 (416-2). At step (452-3), the eNB-2 (416-2) may store the local broadcast data. At step (452-4), the eNB-1 (416-1) and the eNB-N (416-N) may establish X2 link. At step (452-5), the eNB-1 (416-1) may forward local broadcast data to the eNB-N (416-N). At step (452-6), the eNB-N (416-N) may store the local broadcast data. Further, the local broadcast timer may be initiated by the eNB-1 (416-1). Consequently, at step (452-7) the UE (104-2) may transmit a notification representative of the local broadcast to the eNB-2 (416-2) via the SIB13 or the MCCH interface. At step (452-8), the UE (104-2) may transmit broadcast data to the eNB-2 (416-2). At step (452-9), the UE (104-3) may transmit a notification representative of the local broadcast to the eNB-N (416-N) via the SIB13 or the MCCH interface. At step (452-10), the UE (104-3) may transmit broadcast data to the eNB-N (416-N). Subsequently, the local broadcast timer expires. At step (452-11), releasing X2 link between the eNB-1 (416-1) and the eNB-2 (416-2). At step (452-12), releasing X2 link between the eNB-1 (416-1) and the eNB-N (416-N).

In one embodiment, for local multicast. scenario, member registration to the concerned group may be essential. Normally, UE (104) may first need to either attach [in 4G network] or register [in 5G network] with the core network, to avail any services. Here, the sequence may be same for the multicast registration as well. During attach or a TAU procedure, UE (104) can indicate that, the UE (104) wants to become a member of the LB-Family, LB-Friends and/or LB-Corporates groups, or the like. A new IE "LB-Membership-Request" can be added in the ATTACH REQUEST or TRACKING AREA UPDATE messages in 4G or REGISTRATION REQUEST message in 5G. Further, the UE (104) can indicate the types of membership and the associated names to the MME (308). The MME or the AMF, while creating a UE Context, stores this information for future use. The MME (308) or the AMF can relate the LB membership with the list of eNBs (416) and the plurality of cells, from the UE context, because UE context has the TA info within which UE (104) may be currently located and this TA can be mapped to a list of eNBs and the corresponding plurality of cells, along with a corresponding TNL information.

The UE context information at the MME (308) [Similar in AMF as well] can is shown in Table 3 below:

TABLE 3

UE Context at MME

| UE Identity | TA Identity | eNB list | Cell List | LB-Membership list | ... |
|---|---|---|---|---|---|
| S-TMSI/IMSI | | | | Family/ Friends/ Corporates | |
| . | | | | | |
| . | | | | | |
| . | | | | | |

Further, when the UE (104) generates a local broadcast data and the UE (104) wants to upload the local broadcast data to the CNB (416) or the gNB, the UE (104) may first need to establish the RRC Connection. For that new 'establishment cause' needs to be supported. So, a new enumerated type "mo-Data-LB" may be included in the establishment cause 1E. This cause indicates to the CNB or the gNB that, only the RRC connection needs to be established for the Local Broadcast purpose.

When the UE (104) may receive a "PAGING message" for the Local Broadcast type scenario, the UE (104) may have to respond for the received paging. So, the UE (104) may need to establish the RRC connection with the cause indicating that the UE (104) may be a response to Local Broadcast paging. So, a new enumerated type "mt-Access-LB" can be included in the Establishment cause 1E. This cause indicates to the eNB or the gNB, that, the RRC connection may be being established as a response to the Local Broadcast paging. Further, upon successful completion of the RRC Connection establishment for the Local Broadcast purpose, while sending the "RRC SETUP COMPLETE message", the UE (104) may include the IE "lb-Data-Available-Type". This serves two purposes. When the IE may be set to "LB-Own-Cell" or "LB-Own-MBSFN-Area", it indicates to the eNB or the gNB, that UL resources needs to be allocated for uploading the Local Broadcast data, also indicates to communicate with MCE (306) to get MBSFN related information, when the RRC establishment cause may be "mo-Data-LB". When the IE may be set to "LB-Family", "LB-Friends" or "LB-Corporates", the IE indicates to the CNB or the gNB, that UL resources needs to be allocated for uploading the Local Broadcast data, also indicates to communicate with the MME (308) or the AMF to get multicast group related information, when the RRC establishment cause may be "mo-Data-LB". When the IE may be set to "LB-Paging-Response", the IE indicates to the eNB or the gNB, that DL resources needs to be allocated for transmitting the stored Local Broadcast data, when the RRC establishment cause may be "mt-Access-LB".

Furthermore, a new non-UE associated procedure "Local Broadcast Paging" needs to be introduced in S1 Application Protocol (S1AP) or a Next Generation Application Protocol (NGAP). The eNB or the gNB sends the "LOCAL BROADCAST PAGING REQUEST message" to the MME (308)/AMF. This will carry LB-Family-Name, LB-Friends-Name or LB-Corporates-Name. This message indicates to the MME (308)/AMF, that paging request has to be sent for all the associated local broadcast group members. The MME (308)/AMF searches for all the group members using the group name within its OE context database and initiate the Paging request for each of these members. Within the Paging Request message, MME (308)/AMF includes the IE "Paging Type" which can be set to "Local Broadcast".

Similarly, in the RRC paging record, a new IE "lb-Type-Paging" may be introduced, which indicates to the UE (104), that the current paging may be for the local broadcast. This aids the UE (104) to choose the RRC establishment cause as "mt-Access-LB", while initiating the RRC connection establishment, as a response to the paging due to Local Broadcast. Alternatively, instead of adding a new IE, it may be also possible to add an additional enumerated type "lb" for the cn-Domain IE.

Figure 4D:
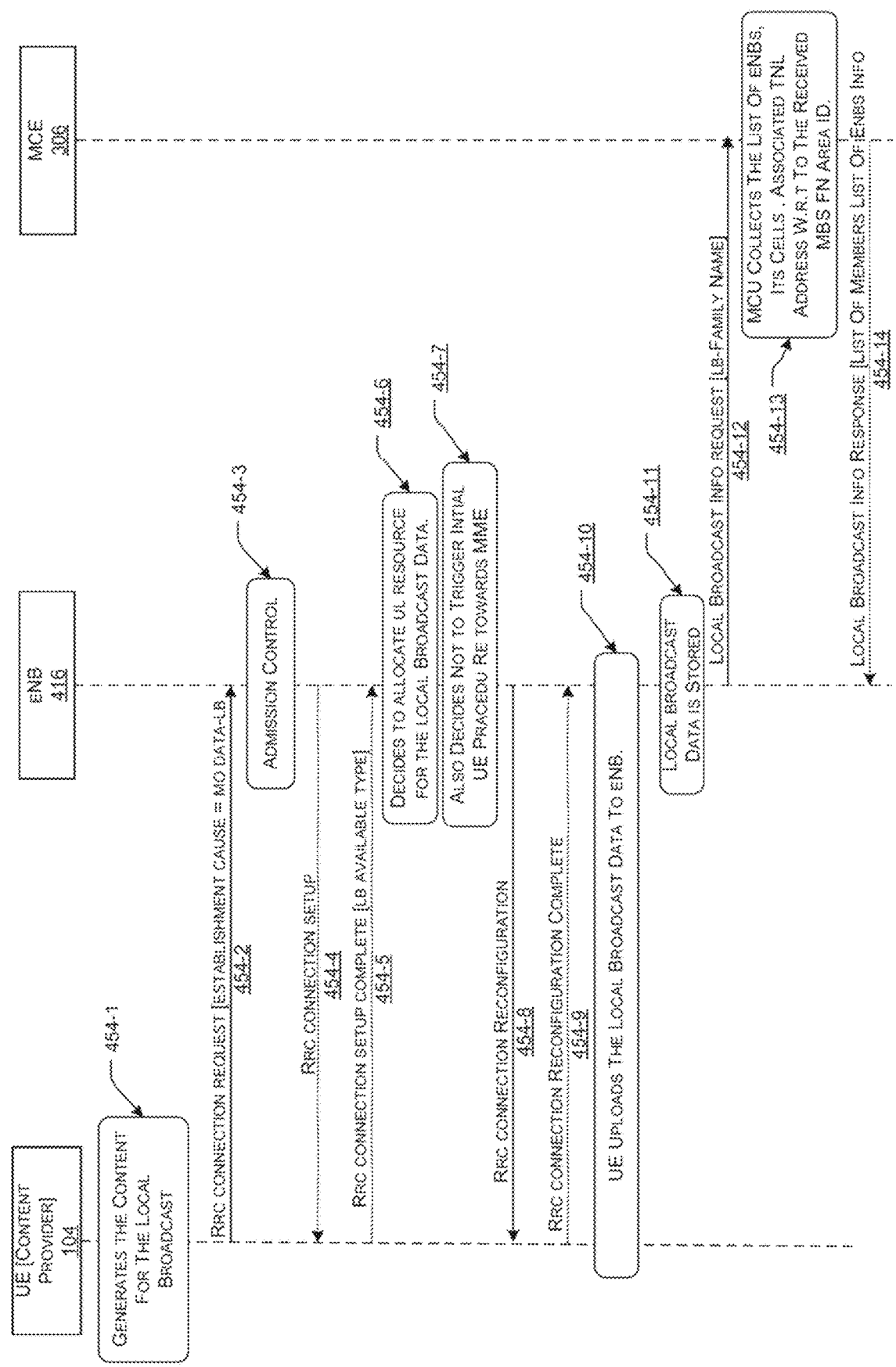
FIG. 4D illustrates an exemplary sequence diagram representation for collecting information for Local Multicast (LM), in accordance with an embodiment of the present disclosure.

FIG. 4D illustrates an exemplary sequence diagram representation for collecting information for Local Multicast (LM), in accordance with an embodiment of the present disclosure.

At step (454-1), the UE (104) may generate the content for the local broadcast. At step (454-2), the UE (104) may transmit the RRC connection request to the eNB (416), wherein the establishment cause=mo-Data-LB. At step (454-3), the eNB (416) may control the admission. At step (454-4), the eNB (416) may transmit the RRC connection setup to the UE (104). At step (454-5), the eNB (416) may transmit the notification of the RRC connection completion to the UE (104). At step (454-6), the eNB (416) may decide to allocate UL resources for the local broadcast data. At step (454-7), the eNB (416) may also decide not to trigger initial UE procedures towards the MME (308). At step (454-8), the eNB (416) may transmit the RRC connection reconfiguration request to the UE (104). At step (454-9), the UE (104) may transmit notification to the eNB (416), upon completion of the RRC connection reconfiguration. At step (454-10), the UE (104) may upload the local broadcast data to the eNB (416). At step (454-11), the local broadcast data may be stored by the eNB (416). At step (454-12), the eNB (416) may transmit the local broadcast information request to the MME (308). At step (454-13), the MME (308) may search the list of all the members of the LB-family name in the UE context database to collect all the list of eNBs and a corresponding TNL addresses associated with the member UEs (104). At step (454-14), the MME (308) may transmit local broadcast information request to the eNB (416).

Figure 4E:
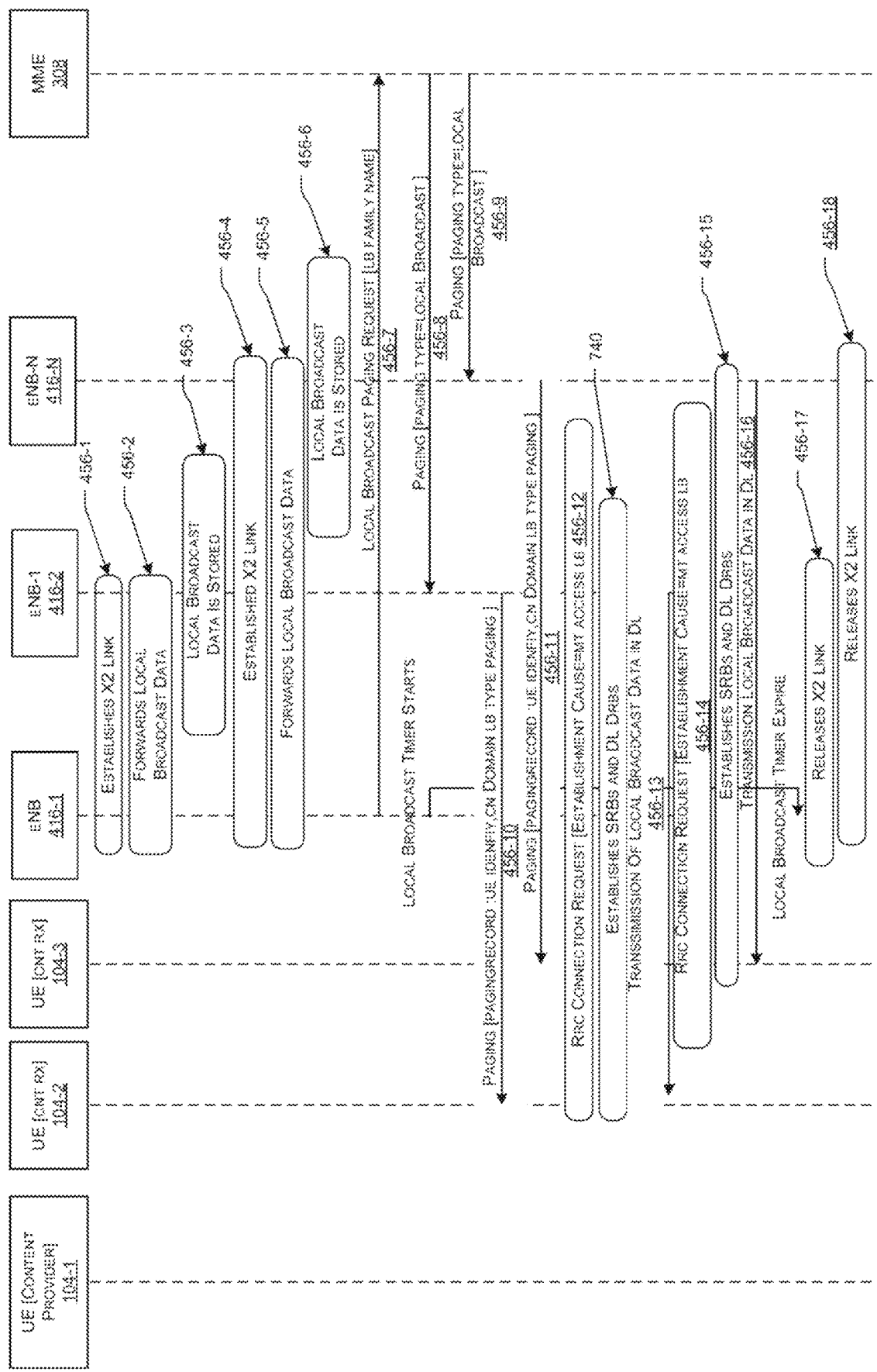
FIG. 4E illustrates an exemplary sequence diagram representation for Local Multicasting (LM) for all group members, in accordance with an embodiment of the present disclosure.

FIG. 4E illustrates an exemplary sequence diagram representation for Local Multicasting (LM) for all group members, in accordance with an embodiment of the present disclosure.

At step (456-1), the eNB-1 (416-1) may establish X2 link with the eNB-2 (416-2) or at step (456-2), the eNB-1 (416-1) may forward the local broadcast data to the eNB-2 (416-2). At step (456-3), the eNB-2 (416-2) may store local broadcast data. At step (456-4), the eNB-1 (416-1) may establish X2 link with the eNB-N (416-N) or at step (456-5), the eNB-1 (416-1) may forward the local broadcast data to the eNB-N (416-N). At step (456-6), the eNB-N (416-N) may store local broadcast data. At step (456-7), the eNB-1 (416-1) may transmit a local broadcast packaging request to the MME 308. The request may be associated to the LB-Family-Name. At step (456-8), the MME 308 may transmit a paging signal to the eNB-1 (416-1). The Paging type=Local Broadcast. Subsequently, the local broadcast timer may be started. At step (456-9), the MME (308) may transmit the paging signal to the eNB-N (416-N). The Paging type=Local Broadcast. At step (456-10), the eNB-2 (416-2) may transmit the paging signal to the UE (104-2). The paging record may be ue-identity, cn-Domain, lb-Type-Paging. At step (456-11), the eNB-N (416-N) may transmit the paging signal to the UE (104-3). The paging record may be UE-identity, Core Network (CN)-Domain, LB-Type-Paging.

At step (456-12), the UE (104-2) may transmit the RRC connection request. to the eNB-2 (416-2). The establishment cause=mt-Access-LB in step 738. As a result, at step (456-13) SRBs and the DL DRBs are established between UE (104-2) and the eNB-2 (416-2). At step (456-14) the eNB-2 (416-2) may transmit local broadcast data to the UE (104-2) using the Downlink (DL). At step (456-15), the UE (104-3) may transmit the RRC connection request to the eNB-N (416-N). At step (456-16), SRBs and the DL DRBs are established between UE (104-3) and the eNB-N (416-N). At step (456-17), the UE (104-3) may transmit the local broadcast data to the eNB-N (416-N) using the DL. Consequently, the local broadcast timer expires. At step (456-18), the X2 link between the eNB-1 (416-1) and the eNB-2 (416-2) may be released. In addition, at step (456-19), the X2 link between the eNB-1 (416-1) and the eNB-N (416-N) may be released.

More specifically, the UE (104), acting as the content provider/source, may upload the local broadcast data to the eNB or the gNB as explained earlier. When the eNB or the gNB receives the "RRC SETUP COMPLETE message" with the IE as "Ib-Data-Available-Type" which may be set to "LB-FAMILY", "LB-FRIENDS" or "LB-CORPORATES", the eNB-1 (416-1) may trigger the S1AP or the NGAP procedure "Local Broadcast Info". The eNB or the gNB sends the S1AP or the NGAP: LOCAL BROADCAST INFO REQUEST message with the IE "LB-Family-Name" set to "LB-FAMILY", "LB-FRIENDS" or "LB-CORPORATES". This aids MME (308) or the AMF to search for all the UEs (104) which are part of this group in its UE context database. For each of these member UEs, the associated TA helps 10 identify the list of eNBs and a corresponding TNL data. The MME (308) or the AMF then responds by sending the S1AP or the NGAP: LOCAL BROADCAST INFO RESPONSE message with the list of eNBs or the gNBs, a corresponding TNL data to the eNB or the gNB. Using this information, the eNB or the gNB establishes the X2 or an Xn links with each of these eNBs or the gNBs and subsequently forwards the Local Broadcast data to each of these eNBs or the gNBs, which in turn stores the received data.

Now the eNB or the gNB transmits the S1AP or the NGAP: "LOCAL BROADCAST PAGING REQUEST" message with the IE "lb-Family-Name" set to "LB-FAMILY", "LB-FRIENDS" or "LB-CORPORATES" to the MME or the AMF and starts the timer "LOCAL BROADCAST TIMER". Then the MME (308) or the AMF may trigger the paging for each of the group members separately. MME or the AMF sends the SLAP or the NGAP: PAGING REQUEST message with the IE "Paging Type" set to "LOCAL BROADCAST" for each of the group members. The CNB or the gNB, in turn initiates the RRC paging by creating Paging Records for these group UEs by including the IE "lb-Type-Paging". This indicates to the UE that, RRC Connection establishment has to be triggered with the Establishment cause set to "mt-Access-LB". At the successful completion of the RRC Connection establishment, the UE sends the RRC SETUP COMPLETE message with the IE "Ib-Data-Available-Type" set to "LB-Paging-Response". This indicates to the eNB or the gNB, that the DL resources needs to be allocated for the transmission of stored local broadcast data. Hence, the eNB or the gNB configures the UE for ORB establishment via RRC Reconfiguration procedure. At the successful completion of the RRC Reconfiguration procedure, the eNB or the gNB forwards the stored local broadcast data to the UE. Finally, at the expiry of the "LOCAL-BROADCAST-TIMER, the original eNB or the gNB releases the X2 or the Xn links with all the group associated eNBs or the gNBs, which in turn deletes the stored local broadcast data.

Figure 5:
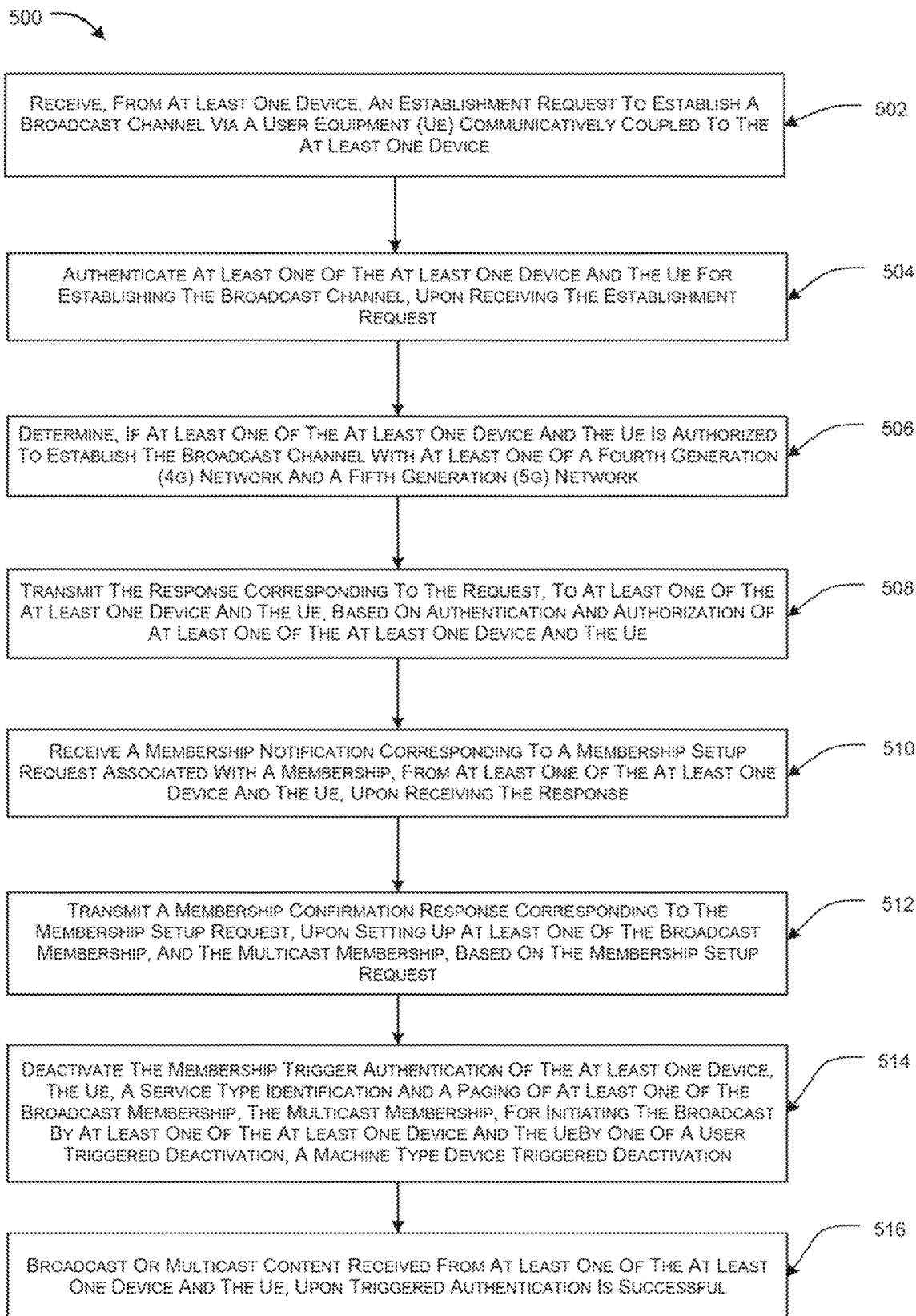
FIG. 5 illustrates exemplary method flow chart depicting a method for broadcasting or multicasting content in networks, in accordance with an embodiment of the present disclosure.

FIG. 5 illustrates exemplary method flow chart depicting a method (500) for broadcasting or multicasting content in networks, in accordance with an embodiment of the present disclosure.

As illustrated in FIG. 5, the method (500) includes one or more blocks illustrating a method of broadcasting or multicasting content in networks. The method (500) may be described in the general context of computer-executable instructions. Generally, computer-executable instructions can include routines, programs, objects, components, data structures, procedures, modules, and functions, which perform functions or implement abstract data types.

The order in which the method (500) may be described may be not intended to be construed as a limitation, and any number of the described method blocks can be combined in any order to implement the method (500). Additionally, individual blocks may be deleted from the methods without departing from the scope of the subject matter described herein. Furthermore, the method (500) can be implemented in any suitable hardware, software, firmware, or combination thereof.

At block (502), the method (500) may include receiving, by the processor (202), from at least one device, an establishment request to establish a broadcast channel via a User Equipment (UE) communicatively coupled to the at least one device, wherein the establishment request includes a location granularity provided by the UE.

At block (504), the method (500) may include authenticating, by the processor (202), at least one of the at least one device (118) and the UE (104) for establishing the broadcast channel, upon receiving the establishment request.

At block (506), the method (500) may include determining, by the processor (202), if at least one of the at least one device (118) and the UE (104) may be authorized to establish the broadcast channel with network. The network includes at least one of a Fourth-Generation (4G) network, a Fifth Generation (5G) network, a Sixth Generation (6G) network, and the like.

At block (508), the method (500) may include transmitting, by the processor (202), the response corresponding to the request, to at least one of the at least one device (118) and the UE (104), based on authentication and authorization of at least one of the at least one device (118) and the UE (104). The response may be received from at least one of the network. The network includes at least one of a Fourth-Generation (4G) network, a Fifth Generation (5G) network, a Sixth Generation (6G) network, and the like.

At block (510), the method (500) may include receiving, by the processor (202), a membership notification corresponding to a membership setup request associated with a membership, from at least one of the at least one device (118) and the UE (104), upon receiving the response, wherein the membership includes at least one of a broadcast membership, and a multicast membership.

At block (512), the method (500) may include transmitting, by the processor (202), a membership confirmation response corresponding to the membership setup request, upon setting up at least one of the broadcast membership, and the multicast membership, based on the membership setup request.

At block (514), the method (500) may include triggering. by the processor (202), authentication of the at least one device (118), the UE (104), a service type identification and a paging of at least one of the broadcast membership, the multicast membership, for initiating the broadcast by at least one of the at least one device (118) and the UE (104).

At block (516), the method (500) may include broadcasting, by the processor (202), or multicast content received from at least one of the at least one device (118) and the UE (104), upon triggered authentication may be successful.

Figure 6:
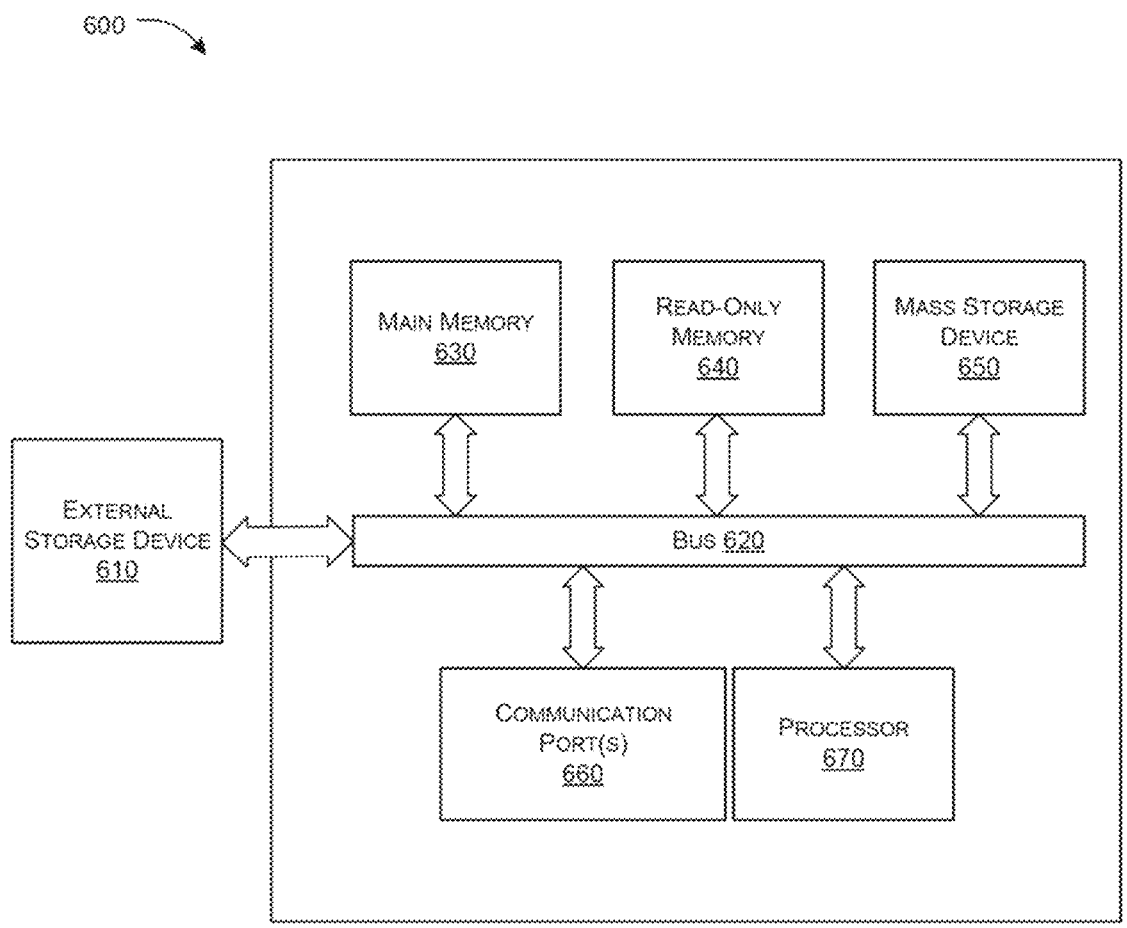
FIG. 6 illustrates an exemplary computer system in which or with which embodiments of the present invention can be utilized, in accordance with embodiments of the present disclosure.

FIG. 6 illustrates an exemplary computer system (400) in which or with which embodiments of the present invention can be utilized, in accordance with embodiments of the present disclosure.

As shown in FIG. 6, computer system (600) can include an external storage device (610), a bus (620), a main memory (630), a read only memory (640), a mass storage device (650), communication port (660), and a processor (670). A person skilled in the art will appreciate that the computer system may include more than one processor and communication ports. Examples of processor (670) include, but are not limited to, an Intel® Itanium® or Itanium 2 processor(s), or AMD® Opteron® or Athlon MP® processor(s), Motorola® lines of processors, FortiSOC™ system on chip processors or other future processors. Processor (670) may include various modules associated with embodiments of the present invention. Communication port (660) can be any of an RS-232 port for use with a modem-based dialup connection, a 10/100 Ethernet port, a Gigabit or 10 Gigabit port using copper or fibre, a serial port, a parallel port, or other existing or future ports. Communication port (660) may be chosen depending on a network, such a Local Area Network (LAN), Wide Area Network (WAN), or any network to which computer system connects. Memory (630) can be Random Access Memory (RAM), or any other dynamic storage device commonly known in the art. Read-only memory (640) can be any static storage device(s) e.g., but not limited to, a Programmable Read Only Memory (PROM) chips for storing static information e.g., start-up or BIOS instructions for processor (670). Mass storage (650) may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 782 family) or Hitachi (e.g., the Hitachi Deskstar 13K800), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus (620) communicatively couples' processor(s) (670) with the other memory, storage and communication blocks. Bus (620) can be, e.g., a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor (670) to software system.

Optionally, operator and administrative interfaces, e.g., a display, keyboard, and a cursor control device, may also be coupled to bus (620) to support direct operator interaction with a computer system. Other operator and administrative interfaces can be provided through network connections connected through communication port (660). The external storage device (610) can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Various embodiments of the present disclosure relate to system and method for broadcasting or multicasting content in networks. The present disclosure enables the broadcasting or multicasting within the RAN and using the core network for a very few functionalities such as paging. This avoids forwarding Local Broadcast (LB) data to the BMSC and again getting back to the RAN for actual broadcast or the multicast of the content. Also, the present disclosure avoids the Authentication and Authorization (AA) performed normally by BMSC for MBMS. Instead, embodiments herein reuse the Authentication performed by the core network during the initial Attach or Registration procedures, as the User Equipment (UE) are Content Providers (CP) or the Content Sources (CS). In the case of Local Broadcast (LB), the UE acting as the CP or the CS, generates the Local Broadcast content and uploads the content to the eNB or the gNB, with which the UE successfully established the RRC Connection. The eNB or the gNB, in turn notifies all the UEs within the cell (in case of own cell level) and all the UEs within all the eNBs or the gNBs belonging to the MBSFN area (in case of own MBSFN level), regarding the resource allocation for the Local broadcast and transmits the actual Local Broadcast data using the MCCH or the MTCH Channel in Fourth Generation (4G) as an example. A mechanism of establishing a local broadcast or a local multicast session in one or more wireless networks for different granularity of live user content distribution may be being disclosed. One use case may be in an enterprise application scenario where multiple local broadcast channels which can be set up to monitor emergency situations. A user can stall broadcasting on such a channel and the subscribed users get a live feed of the emergency. The feed for triggering a broadcast channel could also come from a for example, security camera, and the decision to trigger the broadcast channel would come from a situation analysis via a one of an Artificial Intelligence (AI) or a Machine Learning (ML) analysis tool on, for example, camera.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

We claim:

1. A system for broadcasting or multicasting content in networks, the system comprising:
   a processor;
   a memory coupled to the processor, wherein the memory comprises processor executable instruction, which on execution, causes the processor to:
   receive, from at least one device, an establishment request to establish a broadcast channel via a User Equipment communicatively coupled to the at least one device, wherein the establishment request comprises a location granularity provided by the UE;

authenticate at least one of the at least one device and the UE for establishing the broadcast channel, upon receiving the establishment request;

determine, if at least one of the at least one device and the UE is authorized to establish the broadcast channel with a network;

transmit the response corresponding to the request, to at least one of the at least one device and the UE, based on authentication and authorization of at least one of the at least one device and the UE, wherein the response is received from at least one of the network;

receive a membership notification corresponding to a membership setup request associated with a membership, from at least one of the at least one device and the UE, upon receiving the response, wherein the membership comprises at least one of a broadcast membership, and a multicast membership;

transmit a membership confirmation response corresponding to the membership setup request, upon setting up at least one of the broadcast membership, and the multicast membership, based on the membership setup request;

trigger authentication of the at least one device, the UE, a service type identification and a paging of at least one of the broadcast membership, the multicast membership, for initiating the broadcast by at least one of the at least one device and the UE; and broadcast or multicast content received from at least one of the at least one device and the UE, upon triggered authentication is successful, wherein the UE is initially authenticated by a Broadcast Multicast Service Center (BMSC) using one or more pre-defined procedures defined by at least one of a Mobility Management Entity (MME) associated with the 4G network and an Access and Mobility Management Function (AMF) associated with the 5G network, wherein the MME is communicatively coupled to the UE via an Evolved Universal Terrestrial Radio Access Network (E-UTRAN) and the BMSC is communicatively coupled to the UE via a Multimedia Broadcast Multicast Services-Gateway (MBMS-GW), and is operatively coupled to a content provider, wherein for initially authenticating by the BMSC, the processor is further configured to:

receive an Authentication and Authorization (AA) request from the UE to transmit to the MME during initial attach procedure of the UE, when the UE is a content provider, wherein the AA request is transmitted by the MME to the Multimedia Broadcast Multicast Services-Gateway (MBMS-GW), wherein the attach procedure of the UE comprises mandatory UE network capability Information Element (IE);

receive a Tracking Area Update (TAU) request from the UE to transmit to the MME, when the UE is the content provider, wherein the TAU request comprises optional UE network capability Information Element (IE);

receive a Re Authentication Request (RAR) from the MBMS-GW to transmit to the BMSC;

transmit a RAR response to the MBMS-GW from the BMSC, on successful completion of the authentication and authorization;

transmit an AA response received from the MBMS-GW, to the MME; and authorize the UE to generate the content and to initiate uploading the content, upon the attach procedure or the TAU is completed.

2. The system as claimed in claim 1, wherein the UE network capability Information Element (IE) comprises a UE Content Provider (CP) Information Element (IE), and when the UE CP IE is dynamically updated, then the UE notifies the update to the MME by triggering the TAU procedure, wherein the MME in turn notifies the update to the BMSC for further authentication and authorization of the UE as a content provider or as a content source.

3. The system as claimed in claim 1, wherein receiving, from at least one device, the establishment request to establish the broadcast channel is based on analyzing a situation in an environment of the at least one device, wherein the situation is analyzed using at least one of an Artificial Intelligence (AI) and a Machine Learning (ML) analysis associated with the at least one device.

4. The system as claimed in claim 1, wherein the establishment request comprises at least one of a Radio Resource Control (RRC) message, and a Non-Access Stratum (NAS) message.

5. The system as claimed in claim 1, wherein the at least one of the at least one device and the UE is operated as a content provider or a content source, and a Multimedia Broadcast Multicast Services (MBMS) network infrastructure is reused for the broadcasting or the multicasting the content, wherein when the UE generates the content, the content is first uploaded or streamed to a Broadcast Multicast Service Center (BMSC) using a Uplink (UL) connection, and the BMSC decides, whether to broadcast, multicast or unicast the content based on one or more group subscription of respective UEs.

6. The system as claimed in claim 5, wherein, when the UE is at least one of the content provider and the content source, then the UE generates at least one of local broadcast data and local multicast cast to upload to the RAN, with which the UE has established a Radio Resource Control (RRC) connection.

7. The system as claimed in claim 6, wherein the local broadcast comprises at least one of a cell level area and a Multimedia Broadcast Multicast Service over Single Frequency Network (MBSFN) level area, wherein the local multicast comprises at least one of a family group level, a friends group level, and a corporates group level, and wherein, for the local multicast level, member registration to the concerned group is essential.

8. The system as claimed in claim 1, wherein the membership is deactivated by at least one of, a user triggered deactivation, and a machine type device triggered deactivation.

9. The system as claimed in claim 1, wherein the network comprises at least one of a Fourth-Generation (4G) network, Fifth Generation (5G) network, and Sixth (6G) Generation network.

10. A method for broadcasting or multicasting content in networks, the method comprising:

receiving, by a processor associated with a system, from at least one device, an establishment request to establish a broadcast channel via a User Equipment communicatively coupled to the at least one device, wherein the establishment request comprises a location granularity provided by the UE;

authenticating, by the processor, at least one of the at least one device and the UE for establishing the broadcast channel, upon receiving the establishment request;

determining, by the processor, if at least one of the at least one device and the UE is authorized to establish the broadcast channel with a network;

transmitting, by the processor, the response corresponding to the request, to at least one of the at least one device and the UE, based on authentication and authorization of at least one of the at least one device and the UE, wherein the response is received from the network;

receiving, by the processor, a membership notification corresponding to a membership setup request associated with a membership, from at least one of the at least one device and the UE, upon receiving the response, wherein the membership comprises at least one of a broadcast membership, and a multicast membership;

transmitting, by the processor, a membership confirmation response corresponding to the membership setup request, upon setting up at least one of the broadcast membership, and the multicast membership, based on the membership setup request;

triggering, by the processor, authentication of the at least one device, the UE, a service type identification and a paging of at least one of the broadcast membership, the multicast membership, for initiating the broadcast by at least one of the at least one device and the UE; and broadcasting, by the processor, or multicast content received from at least one of the at least one device and the UE, upon triggered authentication is successful, wherein the UE is initially authenticated by a Broadcast Multicast Service Center (BMSC) using one or more pre-defined procedures defined by at least one of a Mobility Management Entity (MME) associated with the 4G network and an Access and Mobility Management Function (AMF) associated with the 5G network, wherein the MME is communicatively coupled to the UE via an Evolved Universal Terrestrial Radio Access Network (E-UTRAN) and the BMSC is communicatively coupled to the UE via a Multimedia Broadcast Multicast Services-Gateway (MBMS-GW), and is operatively coupled to a content provider, wherein initially authenticating by the BMSC further comprises:

receiving, by the processor, an Authentication and Authorization (AA) request from the UE to transmit to the MME during initial attach procedure of the UE, when the UE is a content provider, wherein the AA request is transmitted by the MME to the Multimedia Broadcast Multicast Services-Gateway (MBMS-GW), wherein the attach procedure of the UE comprises mandatory UE network capability Information Element (IE);

receiving, by the processor, a Tracking Area Update (TAU) request from the UE to transmit to the MME, when the UE is the content provider, wherein the TAU request comprises optional UE network capability Information Element (IE);

receiving, by the processor, a Re Authentication Request (RAR) from the MBMS-GW to transmit to the BMSC;

transmitting, by the processor, a RAR response to the MBMSGW from the BMSC, on successful completion of the authentication and authorization;

transmitting, by the processor, an AA response received from the MBMS-GW, to the MME; and authorizing, by the processor, the UE to generate the content and to initiate uploading the content, upon the attach procedure or the TAU is completed.

11. The method as claimed in claim 10, wherein the UE network capability Information Element (IE) comprises a UE Content Provider (CP) Information Element (IE), and when the UE CP IE is dynamically updated, then the UE notifies the update to the MME by triggering the TAU procedure, wherein the MME in turn notifies the update to the BMSC for further authentication and authorization of the UE as a content provider or as a content source.

12. The method as claimed in claim 10, wherein receiving, from at least one device, the establishment request to establish the broadcast channel is based on analyzing a situation in an environment of the at least one device, wherein the situation is analyzed using at least one of an Artificial Intelligence (AI) and a Machine Learning (ML) analysis associated with the at least one device.

13. The method as claimed in claim 10, wherein the establishment request comprises at least one of a Radio Resource Control (RRC) message, and a Non-Access Stratum (NAS) message.

14. The method as claimed in claim 10, wherein the at least one of the at least one device and the UE is operated as a content provider or a content source, and a Multimedia Broadcast Multicast Services (MBMS) network infrastructure is reused for the broadcasting or the multicasting the content, wherein when the UE generates the content, the content is first uploaded or streamed to a Broadcast Multicast Service Center (BMSC) using a Uplink (UL) connection, and the BMSC decides, whether to broadcast, multicast or unicast the content based on one or more group subscription of respective UEs.

15. The method as claimed in claim 13, wherein, when the UE is at least one of the content provider and the content source, then the UE generates at least one of local broadcast data and local multicast cast to upload to the RAN, with which the UE has established a Radio Resource Control (RRC) connection.

16. The method as claimed in claim 14, wherein the local broadcast comprises at least one of a cell level area and a Multimedia Broadcast Multicast Service over Single Frequency Network (MBSFN) level area, wherein the local multicast comprises at least one of a family group level, a friends group level, and a corporates group level, and wherein, for the local multicast level, member registration to the concerned group is essential.

17. The method as claimed in claim 10, wherein the membership is deactivated by at least one of, a user triggered deactivation, and a machine type device triggered deactivation.

18. The method as claimed in claim 10, wherein the network comprises at least one of a Fourth Generation (4G) network, Fifth Generation (5G) network, and Sixth (6G) Generation network.

* * * * *